(12) United States Patent
McAndrew et al.

(10) Patent No.: US 8,600,602 B1
(45) Date of Patent: Dec. 3, 2013

(54) FLIGHT TECHNICAL CONTROL MANAGEMENT FOR AN UNMANNED AERIAL VEHICLE

(71) Applicant: Honeywell International Inc., Morristown, NJ (US)

(72) Inventors: Katherine McAndrew, Albuquerque, NM (US); Linda J. Watson, Corrales, NM (US); Jon Feist, Albuquerque, NM (US); A. Christopher Moorman, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/932,623

(22) Filed: Jul. 1, 2013

Related U.S. Application Data

(62) Division of application No. 12/497,788, filed on Jul. 6, 2009, now Pat. No. 8,515,609.

(51) Int. Cl.
*G01C 22/00* (2006.01)
*B64C 13/16* (2006.01)
*G09B 9/08* (2006.01)

(52) U.S. Cl.
USPC .............................. 701/23; 244/76 R; 434/31

(58) Field of Classification Search
USPC ............... 701/2, 3, 4–16, 451, 454, 461, 462, 701/463, 466, 468, 470; 244/76 R, 244/174–190; 342/357.2, 357.23; 434/29, 434/30, 31, 34, 38
See application file for complete search history.

(56) References Cited

U.S. PATENT DOCUMENTS

| | | | |
|---|---|---|---|
| 5,550,736 A * | 8/1996 | Hay et al. ........................... | 701/3 |
| 6,056,237 A | 5/2000 | Woodland | |
| 6,377,875 B1 | 4/2002 | Schwaerzler | |
| 6,453,731 B1 * | 9/2002 | Yaegashi ..................... | 73/114.52 |
| 7,415,327 B2 * | 8/2008 | Cabrera et al. ..................... | 701/3 |
| 7,581,702 B2 * | 9/2009 | Olson et al. ................... | 244/189 |

(Continued)

FOREIGN PATENT DOCUMENTS

| | | |
|---|---|---|
| EP | 1901153 A1 | 9/2006 |
| WO | 01/88648 A2 | 11/2001 |

(Continued)

OTHER PUBLICATIONS

U.S. Appl. No. 12/331,274 entitled "Modular Software Architecture for an Unmanned Aerial Vehicle" and filed Dec. 9, 2008, currently unpublished.

(Continued)

*Primary Examiner* — Muhammad Shafi
(74) *Attorney, Agent, or Firm* — Shumaker & Sieffert, P.A.

(57) ABSTRACT

Two architectures for unmanned aerial vehicles (UAVs) and a method for executing a mission plan are provided. One architecture for a UAV includes a flight command and mission execution (FCME) component making strategic decisions, a flight technical control manager (FTCM) making tactical decisions and a vehicle management system (VMS) providing navigational support. The FCME and FTCM execute on one processor and the VMS executes on a separate processor. The second architecture includes redundant processors for executing the FCME and FTCM as well as redundant processors for executing the VMS. The UAV executes a mission plan, which may include flight plan(s), communication plan(s), weapons plan(s), sensor plan(s), and/or contingent flight plan(s). The UAV may control various optical sensors, training sensors, and lights as well.

17 Claims, 8 Drawing Sheets

(56) References Cited

U.S. PATENT DOCUMENTS

| | | | |
|---|---|---|---|
| 2005/0004723 | A1 | 1/2005 | Duggan et al. |
| 2007/0021880 | A1 | 1/2007 | Appleby et al. |
| 2007/0032920 | A1 | 2/2007 | Dapp et al. |
| 2007/0069083 | A1 | 3/2007 | Shams et al. |
| 2008/0027590 | A1 | 1/2008 | Phillips et al. |
| 2009/0088972 | A1* | 4/2009 | Bushnell ............ 701/210 |
| 2009/0125163 | A1* | 5/2009 | Duggan et al. ............ 701/2 |
| 2009/0210109 | A1* | 8/2009 | Ravenscroft ............ 701/26 |

FOREIGN PATENT DOCUMENTS

| | | | |
|---|---|---|---|
| WO | 2005/073085 | A1 | 8/2005 |
| WO | 2006/091340 | A2 | 8/2006 |
| WO | 2007/047510 | A2 | 4/2007 |
| WO | 2007/047514 | A2 | 4/2007 |
| WO | 2007/143457 | A2 | 12/2007 |
| WO | 2008/085536 | A2 | 7/2008 |

OTHER PUBLICATIONS

U.S. Army, "Unmanned Aerial Vehicles", Sep. 28, 2007, available at http://www.fcs.army.mil/downloads/pdf/UAV_Flyer.pdf (last visited May 13, 2009).

U.S. Army, "XM157 Class IV Unmanned Aerial Vehicle (UAV)", Feb. 20, 2009, available at http://www.fcs.army.mil/systems/uaviv/index.html (last visited May 13, 2009).

U.S. Army, "XM156 Class I Unmanned Aerial Vehicle (UAV)", Feb. 20, 2009, available at http://www.fcs.army.mil/systems/uavi/index.html (last visited May 13, 2009).

Ed Grabianowski, "How Future Combat Systems Will Work", How StuffWorks, Inc., available at http://science.howstuffworks.com/fcs.htm/printable (last visited May 13, 2009).

Robert Valdes, "How the Predator UAV Works", HowStuffWorks Inc., available at http://science.howstuffworks.com/predator.htm/printable (last visited May 13, 2009).

T. Cole et al., "NOIA Conference—Reducing Technology Risk in Acquisition Programs", Apr. 18, 2007, available at http://www.dtic.mil/ndia/2007science/Day02/thomascole.pdf (last visited May 13, 2009).

Defense Industry Daily, "Four FCS UAV Sub-Contracts Awarded (updated)", Jan. 12, 2007, available at http://www.defenseindustrydaily.com/four-fcs-uav-subcontracts-awarded-updated-0928/ (last visited May 13, 2009).

Northrup Grumman Electronic Systems, "Survivability Sensor Suite (SSS) for Class III and Class IV Unmanned Air Vehicles", Revision F, Aug. 8, 2006, Baltimore, MD, available at: http://www.boeing.com/defense-space/ic/fcs/bia/060817 sensor.html (last visited May 13, 2009).

S. Dixon et al., "Mission Control of Multiple Unmanned Aerial Vehicles: A Workload Analysis", Human Factors, 47(3), pp. 479-487, available at http://www.stephenrice.us/journals/DixonWickensChang.pdf (last visited May 13, 2009).

G. Vachtsevanos et al., "An Intelligent Approach to Coordinated Control of Multiple Unmanned Aerial Vehicles", available at http://www.vtol.org/pdf/uav-60.pdf (last visited May 13, 2009).

M. Degarmo et al., "Prospective Unmanned Aerial Vehicle Operations in the Future National Airspace System", AIAA 4th Aviation Technology, Integration and Operations (ATIO) Forum, Chicago, Illinois, Sep. 20-22, 2004, D available at http://pdf.aiaa.org/preview/CDReadyMATIO2004_1 008/PV2004_6243.pdf (last visited May 13, 2009).

Joint Architecture for Unmanned Systems Working Group, "Reference Architecture Specification", vol. II, Part 1, Version 3.3, Jun. 27, 2007, available at http://www.jauswg.org/baseline/Finai%20RA%20V3-3%20Part%201.doc (last visited May 13, 2009).

Joint Architecture for Unmanned Systems Working Group, "Reference Architecture Specification", vol. II, Part 2, Version 3.3, Jun. 27, 2007, available at http://www.jauswg.org/baseline/Finai%20RA%20V3-3%20Part%201.doc (last visited May 13, 2009).

Joint Architecture for Unmanned Systems Working Group, "Reference Architecture Specification", vol. II, Part 3, Version 3.3, Jun. 27, 2007, available at http://www.jauswg.org/baseline/Finai%20RA%20V3-3%20Part%201.doc (last visited May 13, 2009).

* cited by examiner

FLIGHT TECHNICAL CONTROL MANAGEMENT FOR AN UNMANNED AERIAL VEHICLE

This application is a divisional of U.S. application Ser. No. 12/497,788, filed Jul. 6, 2009 and entitled, "FLIGHT TECHNICAL CONTROL MANAGEMENT FOR AN UNMANNED AERIAL VEHICLE," the entire content of which is incorporated by reference herein. U.S. application Ser. No. 12/497,788 published as U.S. Patent Application Publication No. 2011/0035149 on Feb. 10, 2011.

GOVERNMENT LICENSE RIGHTS

The United States Government has acquired certain rights in this invention pursuant to Contract # W56 HZV-05-C-0724, awarded by the US Army Tank—Automotive and Armaments Command.

FIELD OF THE INVENTION

This invention relates to the field of software architecture. More particularly, this invention relates to modular software architecture organized by layers and segments which can be applied to systems which contain multiple domains or functionality, such as unmanned aerial vehicles (UAVs).

BACKGROUND

The military, police, rescue, scientific, and commercial communities use unpiloted aircraft, such as UAVs. One definition of a UAV is an unmanned device capable of controlled, sustained, and powered flight. As such, the designs of UAVs consist of aircraft of various sizes, capabilities, and weights. A typical UAV consists of a propulsion device, such as an engine, a navigation system, one or more payload sensors, communication equipment, and possibly cargo. The sensors may provide information to a ground observer about the terrain the UAV overflies, such as video information about a lost hiker in a rescue application, information from laser and/or biological sensors about environmental conditions in a scientific or security application, or a combination of video, laser, biological and other sensors concerning battlefield conditions in a military application. The cargo may be munitions, food, medicine, and/or other goods depending on the mission of the UAV. As technology improves, the design of the UAV may change to integrate new and/or improved sensors, navigation systems, propulsion devices, and the like.

As the UAV is unmanned, computer software executing on one or more processors aboard the UAV partially or completely controls the UAV. The computer software may control the various functions performed by the UAV, perhaps with the aid of the ground observer.

SUMMARY

A first embodiment of the invention provides an aerial vehicle. The aerial vehicle includes a processing unit, data storage, and machine-language instructions. The machine-language instructions are stored in the data storage and are executable by the processing unit to perform functions. The functions include: (a) receiving a mission plan, which includes a flight plan, (b) validating the mission plan, (c) executing the mission plan by at least directing the aerial vehicle to travel along a flight plan of the mission plan, (d) determining a current location of the aerial vehicle is outside the flight plan, and (e) responsively executing a contingent flight plan.

A second embodiment of the invention provides an aerial vehicle. The aerial vehicle includes a first redundant processing unit, a first data storage and first machine language instructions. The first redundant processing unit includes a first processor and a second processor. The first machine-language instructions are stored in the first data storage and executable by at least one processor of the first redundant processing unit to perform first functions. The first functions include: (a) receiving a mission plan that includes a flight plan and a contingency plan, (b) validating the mission plan, (c) executing the mission plan based on the flight plan, and (d) synchronizing the first processor and the second processor.

A third embodiment of the invention provides a method for executing a mission plan. The mission plan is received at an aerial vehicle. The mission plan includes a flight plan, a sensor plan, a communication plan, a contingency flight plan, and a weapon plan. The mission plan is determined to be valid. In response, a notification is sent indicating the mission plan is valid. The mission plan is loaded into one or more processors of the aerial vehicle. At least part of the mission plan is executed.

BRIEF DESCRIPTION OF THE DRAWINGS

Various examples of embodiments are described herein with reference to the following drawings, wherein like numerals denote like entities, in which.

DETAILED DESCRIPTION

Figure 1:
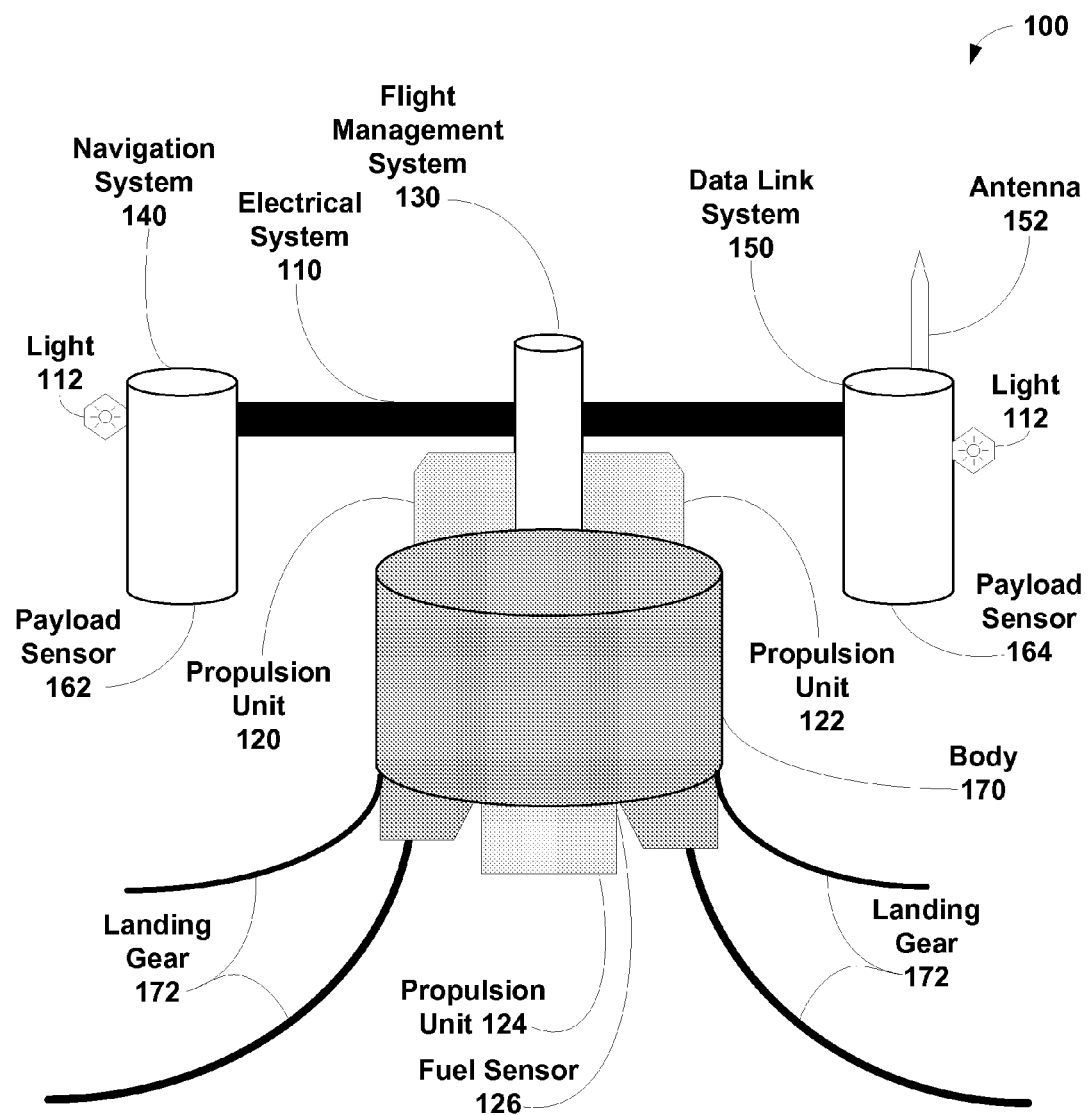
FIG. 1 shows an example UAV, in accordance with embodiments of the invention.

The present invention includes methods and apparatus for controlling a UAV. The UAV may provide a networked situational awareness capability to a military unit, such as a platoon or a division. The UAV may secure areas and/or provide reconnaissance, surveillance, and target acquisition (RSTA).

UAV control may reside both on board the aircraft and on the ground. UAV control may include a strategic or "command and mission execution" (CME) component and a tactical or "technical control manager" (TCM) component. The CME component provides high level control and may be shared between a ground CME (GCME) residing with ground control and an on-board or "flight" CME (FCME), residing on the UAV. The TCM component may include both ground and flight components or may just have a flight TCM (FTCM) component.

The FTCM may provide tactical control of the UAV while the FCME and GCME may provide strategic control. As such, the GCME is the main controller for the air vehicle; it provides mission management (i.e., communication, sensor, and mission plan management) for the UAV via commands to the FCME and/or FTCM. The FTCM may process the commands directly or may pass the commands through to other vehicle components. The FTCM has the ability to support commands through critical and non-critical paths for message priority and security.

The UAV may be equipped with sensors and cameras that provide real-time data to the ground control. In addition, the UAV may be equipped with weapons, such as rockets or bombs. Ground control may remotely launch the UAV's weapons in real time. The UAV may be configured to be carried by one or more platforms (e.g., vehicles) or persons (e.g., soldiers or police officers). The UAV may be carried by one or more dismounted persons in a protective transportation container that protects the system from natural and induced environments.

The FTCM may provide a variety of services and interfaces within and external to the UAV, such as mission plan services, sensor management, and configuration utilities. The FTCM may enable loading of mission plans (e.g., flight plans, contingency flight plans, communication plans, rate commands, and/or sensor plans) from the ground control, and verify that a loaded mission plan is valid. For example, a mission plan may include one or more flight plans, each with a list of one or more waypoints, timing requirements, sensor plans, and/or weapons plans. The waypoints and timing requirements may indicate where and when, respectively, the UAV should be to achieve a mission set forth by the mission plan. A sensor plan, communications plan, or a weapons plan may indicate how sensors, communication equipment, or weapons aboard the UAV, respectively, should be deployed during the mission.

While on a mission, the FTCM may ensure compliance with the mission plan, by continuously verifying that the current location of the UAV is according to plan. The FTCM may issue commands to communicate with the ground control (e.g., the GCME) and/or other vehicles during the mission based on the communication plan. The FTCM may also monitor the performance and health of the UAV during the mission. As part of the communication plan or otherwise, the FTCM may provide information about the health of the UAV and/or components of the UAV to the GCME, perhaps as part of a health report. The FTCM may utilize navigational sensors to determine the current location, velocity and/or acceleration of the UAV. Vehicle management system (VMS) software and/or hardware may navigate the UAV. The VMS may manage navigation sensors and provide navigational data to the FTCM.

The VMS and FTCM may share computer-hardware resources, such as one or more processors or memory, or may utilize separate computer-hardware resources. In some embodiments, the FTCM and/or the VMS may have redundant processors; that is, the FTCM may execute software on one or more active or "primary" processors and have one or more "secondary" processors available to run FTCM software in case the primary processor(s) fail. A similar primary/secondary designation and operation of redundant VMS processors may be used as well.

The FTCM may receive instructions to adhere to a new mission plan or to change portions of the current mission plan while in operation. The instructions and changes may be communicated from ground control via the GCME, to the FCME, and then to the FTCM. The FCME may provide instructions autonomously to the FTCM as well. Upon receiving the instructions/changes from the FCME/GCME, the FTCM may issue commands to sensors and/or navigational systems (i.e., the VMS) to change sensor deployment and/or course in accordance with (now current) mission plan.

Software developed for use aboard the UAV (e.g., software components of the FTCM, the FCME, and the VMS) and/or for use by ground control may be designed according to a segmented and layered architecture that provides a framework for well-designed software that promotes loose coupling between "software entities". Example software entities are software objects, modules, functions, subroutines, code, computer data, data objects, databases, and/or data structures. An example segmented and layered architecture for UAV development is disclosed in U.S. patent application Ser. No. 12/331,274 entitled "Modular Software Architecture for an Unmanned Aerial Vehicle" and filed on Dec. 9, 2008 ("the '274 Application"), which is incorporated by reference for all purposes.

The division of different software and hardware components for strategic (i.e., GCME/FCME), tactical (i.e., FTCM), and navigational control (i.e., VMS) provides several advantages. This division allows for concentration and specialization of resources within each area, as well as clear-cut responsibilities within each component. This division allows for well-defined interfaces between components, which allows for greater parallelism during software and hardware development. The well-defined interfaces provide isolation for data and control critical to the safety of the UAV. By use of well-defined interfaces and various components of the mission plan (e.g., flight plans, weapons/sensor plans, and communications plans), vehicle control, payload control, and communication control are separated, allowing for ready updating and fault isolation for each of the components and/or well-defined interfaces. Also, software (or hardware) components may be replaced without affecting other components as long as the well-defined interfaces are enforced. The ability to replace components individually eases the process of updating components for maintenance, growth, and/or the addition of new technology.

The herein-described invention may be applicable to other devices or vehicles as well, such as but not limited to unmanned ground vehicles (UGVs), ground vehicles, manned aerial vehicles, manned or unmanned naval vessels, and/or semi- or completely-automated machinery (e.g., some or all of the components in a factory).

An Example UAV

Turning to the figures, FIG. 1 shows an example UAV 100, in accordance with embodiments of the invention. FIG. 1 shows the UAV 100 with an electrical system 110, propulsion units 120, 122, and 124, a flight management system 130, a navigation system 140, a data link system 150 with an antenna 152, payload sensors 162 and 164, a body 170, and landing gear 172.

The electrical system 110 may include various electrical/electronic devices and equipment to provide and monitor the flow of electricity throughout the UAV 100. One example set of devices are the lights 112. Other example electrical/electronic devices and equipment include, but are not limited to, wires, cables, switches, lights, electrical devices (e.g. capacitors, inductors, diodes, transistors, etc.), light emitting diodes (LEDs), power devices (such as generators and/or batteries), electrical sensors, fuses, and/or circuit breakers. The electrical system 110 may also include a control panel as well for monitoring and controlling the electrical system 110. The electrical system 110 may include other electrically-powered devices, such as (but not limited to) anti-collision lights and battery charging/monitoring circuitry.

The propulsion units 120, 122, and 124 may provide power to move the UAV 100. The propulsion units may include one or more engines, fans, pumps, rotors, belts, and/or propellers. One or more engine control units (ECUs) may control the propulsion units 120, 122, and 124. For example, an ECU may control fuel flow in an engine based on data received from various engine sensors, such as air and fuel sensors. The propulsion units 120, 122, and 124 may have one or more fuel tanks, one or more fuel pumps to provide the fuel from the fuel tank(s) to the propulsion units 120, 122, and 124, and/or one or more fuel controllers. The propulsion units 120, 122, and 124 may also include one or more fuel sensors 126 to monitor fuel levels of the fuel tank(s).

The flight management system 130 may provide flight planning, flight guidance, and flight controls functionality for the UAV 100, akin to the control provided by a human pilot in a manned aircraft. The flight management system 130 may include flight control algorithms and/or servos (electro-mechanical devices) that manipulate various flight-control surfaces of the UAV 100. For example, one or more servos may control a rudder or aileron(s) of the UAV 100. The flight management system may include a throttle control mechanism, instead or as well.

The navigation system 140 may provide navigational data, including data about nearby aircraft, to the UAV 100. The navigation system 140 may include location devices for the UAV 100, such as, but not limited to, magnetometers, gyroscopes, lasers, Global Positioning System (GPS) receivers, altimeters, inertial navigation units, ground proximity sensors, and other navigation components. The location devices may include additional sensors to provide additional data about the environment for the UAV 100, such as pressure sensors, thermometers, and/or other environment sensors.

The data link system 150 may permit communication between the UAV 100 and other devices or vehicles. For example, the data link system 150 may permit communication with other UAVs in use at the same time as the UAV 100. The data link system 150 may permit communication with one or more ground control devices as well. The data link system 150 may use one or more wireless communication devices, such as an antenna 152, for communication. In an alternative not shown in FIG. 1, the data link system 150 may use one or more wired communication devices, such as Ethernet cables, ports, and/or cards, perhaps while the UAV 100 is tethered to the ground. The data link system 150 may include one or more (ports for) removable and/or down-loadable storage devices. The removable and/or down-loadable storage devices may store data such as, but not limited to, telemetry and sensor data (e.g., video data, audio data, images, and/or collected data on sensor readings).

The UAV 100 may be equipped with a payload including payload sensors 162 and 164. The payload sensors 162 and 164 may include video sensors, such as cameras, laser designators, chemical sensors, biological sensors, smoke detectors, radiation detectors, electromagnetic wave detectors, and other payload sensors. The UAV 100 may be configured so that the payload sensors 162 and 164 may change between missions as well. For structural support and other reasons, the UAV 100 may have a body 170 and landing gear 172.

The shapes of the body 170 and/or landing gear 172 shown in FIG. 1 are examples only and may vary. For example, the body 170 may have an aerodynamic shape, such as found in a body of a conventional manned aircraft. The landing gear 172 may or may not have controls, such as controls that allow the landing gear 172 to be retracted into the body 170.

An Example Aerial Vehicle Control System

Figure 2:
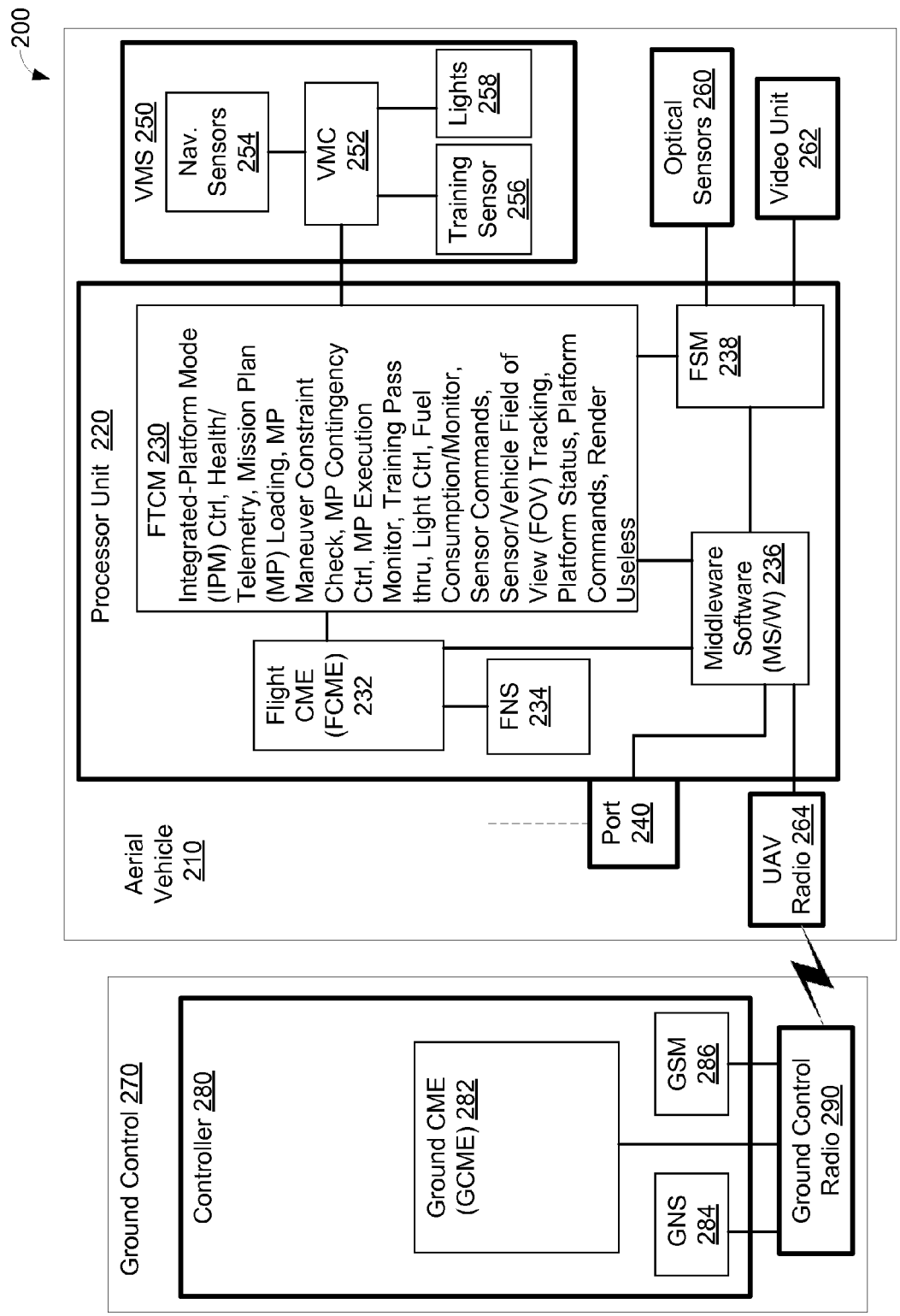
FIG. 2 shows an example aerial vehicle control system, in accordance with embodiments of the invention.

FIG. 2 shows an example aerial vehicle control system 200, in accordance with embodiments of the invention. The aerial vehicle control system 200 includes an aerial vehicle 210 (e.g., a UAV) and a ground control 270. The aerial vehicle 210 includes a processor unit 220 with a port 240, a vehicle management system (VMS) 250, optical sensors 260, a video unit 262, and a UAV radio 264. The processor unit 220 may be configured to execute flight management software, such as but not limited to, a flight technical control manager (FTCM) 230, a flight command and mission execution (CME) component 232, a flight network software (FNS) component 234, middleware software (MS/W) 236, and a flight sensor manager (FSM) 238.

The FSM 238 may provide the FTCM 230 with an interface to optical sensors 260 and/or video unit 262. Data destined for the FTCM 230 through and to the optical sensors 260 and/or video unit 262 may be sent/received via the FSM 238; the data may include but is not limited to sensor control and status information.

The FTCM 230 may receive critical vehicle control and status information from the VMS 250 via a native connection. Where possible, point-to-point communication provided by middleware software 236 may be used as a communication mechanism between the entities of aerial vehicle control system 200.

The FNS component 234 may provide an interface and/or support for network services, such as but not limited to, configuration/Reconfiguration of radios, status monitoring (perhaps in conjunction with middleware software 236), and network communication services, such as point-to-point connections, (priority-based) packet routing services (e.g., secure or critical path routing), quality-of-service (QoS) monitoring, and/or remote operation and/or supervision of the aerial vehicle. The FNS component 234 may enable establishment and maintenance of a number of pathways, such pathways described below with respect to FIG. 3.

Figure 3:
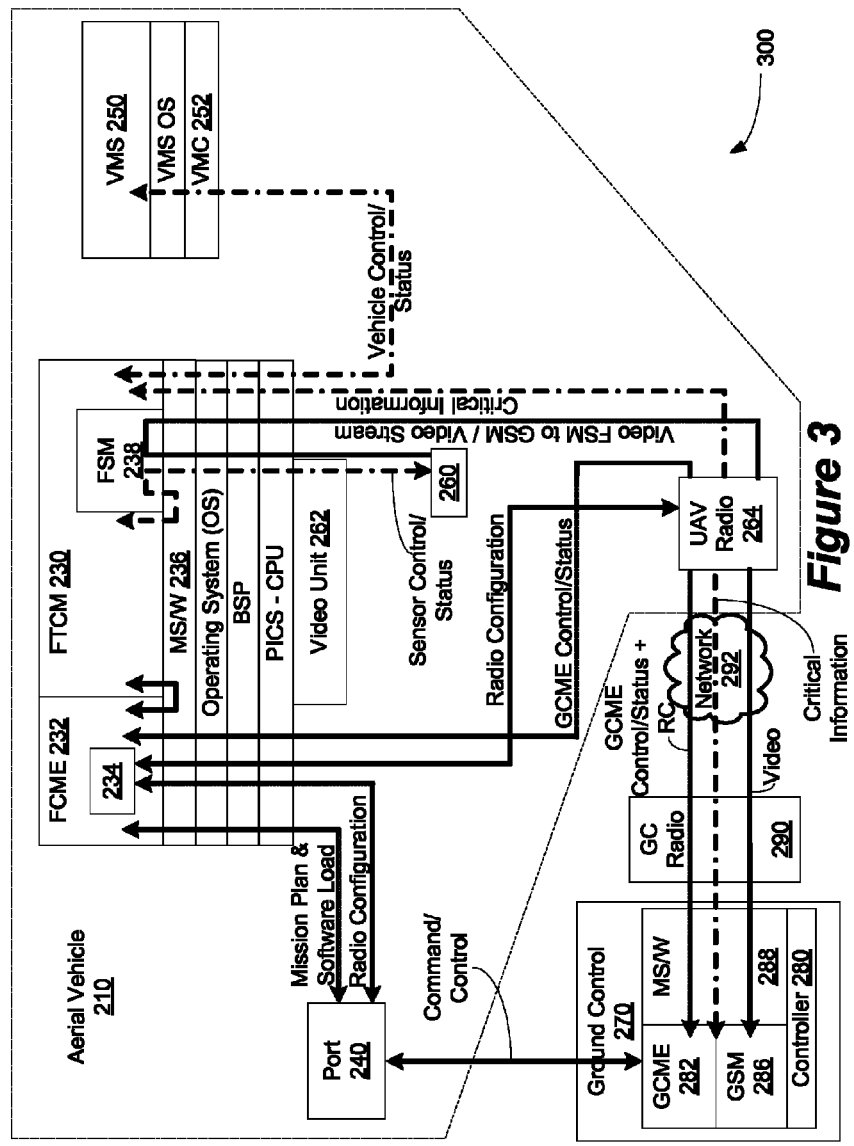
FIG. 3 shows an example architecture for the example aerial vehicle control system, in accordance with embodiments of the invention.
Figure 5:
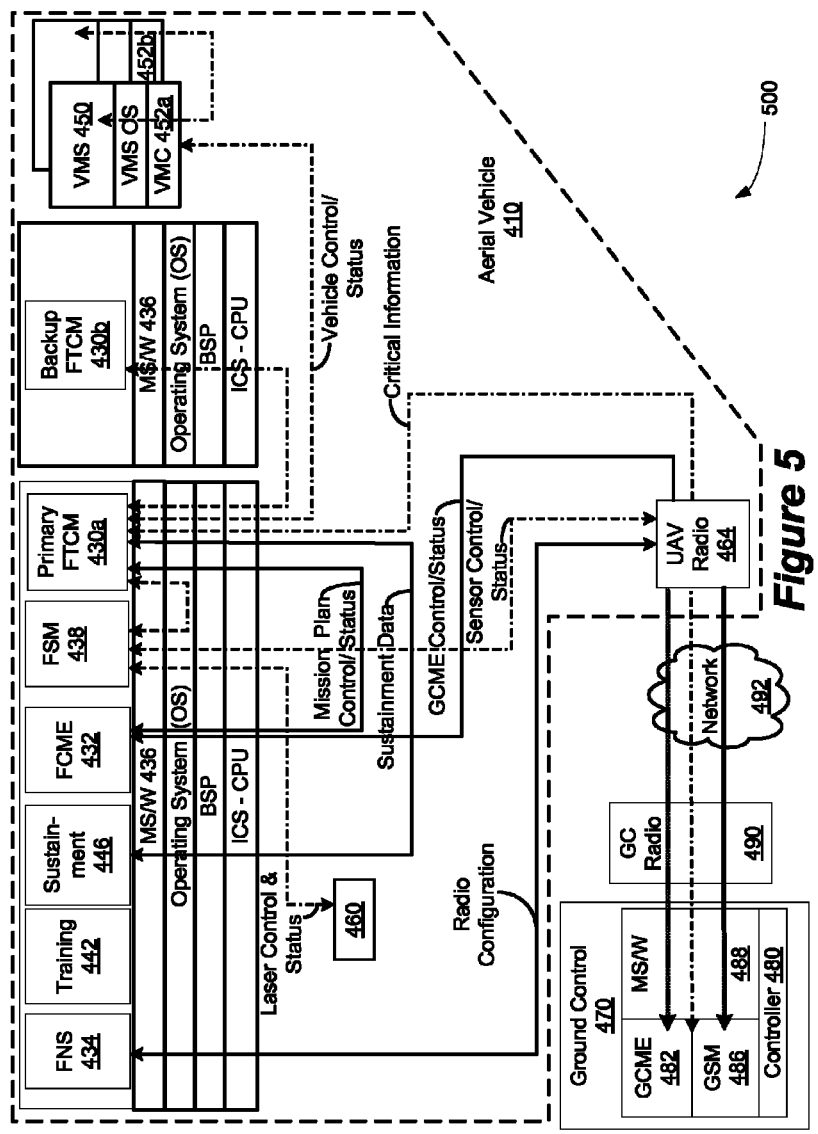
FIG. 5 shows an example architecture for an aerial vehicle control system with redundant components, in accordance with embodiments of the invention.

Middleware software 236 generally may provide interfaces between application software and the operating system (e.g., as shown in FIGS. 3 and 5). With regard to FIG. 2, the middleware software 236 may provide the FTCM 230 with interfaces for Communication Services (using a Network Software library), to perform checkpoints, obtain checkpoint status and general system services. Middleware software 236 may be able to prioritize one or more messages and thus set up communications pathways of differing priorities, such as described below with respect to FIG. 3.

The vehicle management system 250 may include a vehicle management controller (VMC) 252, one or more navigation sensors 254, training sensors 256, and/or lights 258. The navigation sensors 254 may include one or more sensors to provide data used in navigating the aerial vehicle 210, but are not limited to, global positioning system (GPS) or other sensors equipped to receive and/or process navigation signals (perhaps received from one or more ground control devices, other UAVs, and/or satellites), dead-reckoning devices, (laser) rangefinders, inertial guidance sensors (e.g., gyroscopes), compasses, radar emitter and/or detectors, sound sensors, meteorological/environmental sensors (e.g., temperature and/or wind sensors), and/or image processing (e.g., feature and/or landmark detection) systems. The navigational sensors may provide data such as, but not limited to, a current location, velocity, and/or acceleration of the aerial vehicle 210, location(s) of nearby vehicle(s), and/or atmospheric conditions. The training sensors 256 may include, but are not limited to, Multiple Integrated Laser Engagement System (MILES) sensor(s) and/or laser designator(s). The lights 258 may include one or more lights suitable for various purposes (i.e., anti-collision lights, ground illumination, illumination for video sensors) and may utilize any suitable lighting technology (e.g., incandescent bulbs, fluorescent lighting, light emitting diodes (LEDs), liquid crystal display (LCD), and halogen lighting).

The optical sensors 260 may include sensors configured to observe various frequencies and types of light, such as but not limited to, visible light, infra-red, ultra-violet, X-rays, microwaves, laser light, and/or electromagnetic pulses. The optical sensors 260 may include one or more still cameras, video cameras, and/or specialized detectors/sensors (e.g., X-ray detector, EMP sensor, and/or laser detectors). The optical sensors 260 may also include one or more lasers, perhaps used in one or more laser range finders and/or for training purposes. One or more of the optical sensors 260 may be mounted in gimbal(s) that permit rotation along one or more degrees of freedom.

The video unit 262 may be configured to receive video or other data from one or more sensors aboard the aerial vehicle 210 (e.g., optical sensors 260), process the video/other data, and then record and/or output the processed (or unprocessed) video/other data. Processing of video/other data may include, but is not limited to, use of compression, decompression, image processing, image enhancement, and/or location determination techniques. The video unit 262 may include one or more video storage devices (e.g., random access memory, flash memory, and disk storage) for storing compressed and/or uncompressed video and/or other data.

The UAV radio 264 may be a radio transceiver configured to communicate with one or more other radios. In particular, the UAV radio 264 may be configured to communicate with one or more ground control radios, such as ground control radio 290.

The ground control 270 may include a controller 280 and the ground control radio 290. The controller 280 may include software, such as, but not limited to, ground command and mission execution (GCME) software 282, ground network software (GNS) 284, and ground sensor management (GSM) software 286. One or more computing devices, such as described below with respect to FIG. 6, or other computing device(s)/CPUs may act as the controller 280.

The GCME 282, GNS 284, and GSM 286 may perform similar functions for the ground control 270 that the corresponding FCME 232, FNS component 234, and FSM 238 respectively perform for the aerial vehicle 210. Note that the FSM 238 may manage video stream data, perhaps by sending one or more video streams to the GSM 286 without interaction with the FTCM 230.

The ground control radio 290 may be a radio transceiver configured to communicate with one or more other radios, including the UAV radio 264. The ground control 270 may use the ground control radio 290 to send commands and/or data to the aerial vehicle 210. In addition, the ground control radio 290 may receive sensor and/or other data from the aerial vehicle 210.

Example Functionality of the Flight Technical Control Manager

As shown in FIG. 2, the FTCM 230 may provide a number of controls and services for the aerial vehicle control system 200. These controls and services may include, but are not limited to, integrated-platform mode (IPM) control, health/telemetry services, mission plan loading, maneuver constraint checks, contingency controls and execution monitoring, a training pass through, sensor controls and services (i.e., light controls, fuel consumption and monitoring via fuel sensors, support for sensor commands, and for sensor/vehicle field of view (FOV) tracking), platform commands and status information including vehicle handoff, and support for a render useless commands. In addition, the FTCM 230 may provide pass-through functionality for the FCME 232 and/or GCME 282; that is, route commands from the FCME 232 and/or GCME 282 to the appropriate destinations and route data from the destinations to the FCME 232 and/or GCME 282.

Integrated-platform mode control may include changing modes as directed by the FCME 232 and/or GCME 282, reporting mode information, verifying mode changes, and preventing invalid mode changes. The FTCM 230 may report current platform operating mode and current integrated-platform mode information to the GCME 282. The FTCM 230 may prevent unintended integrated-platform mode transitions by validating any commands input to the aerial vehicle control system 200, ensuring the commands are appropriate for the current integrated-platform mode, and disabling invalid integrated-platform mode transitions. For example, this prevents unintended activation of a maintenance command during operational flight. Example integrated-platform modes are: integrated-platform-safe mode, integrated-platform-maintenance mode, integrated-platform-training mode, and integrated-platform-operational mode. Other integrated-platform modes are possible as well. The integrated-platform-safe mode may accept a configuration command(s) as appropriate, the integrated-platform-maintenance mode may accept configuration and maintenance command(s) as appropriate, the integrated-platform-training mode may accept a subset of all operational commands as appropriate, and the integrated-platform-operational mode may accept all operational commands as appropriate.

For health services, the FTCM 230 may monitor internal health, status and/or faults of the aerial vehicle control system 200, including the FNS component 234, middleware software 236, FSM 238 and/or VMS 250 and report the internal health, status and/or faults to the FCME 232 and/or GCME 282. The health report may include availability information, such as whether a component is active, inactive but available or out of service. The health report may include fault-related data such a fault count or rate information, debugging information, fault severity data. The health report may include availability information and/or fault-related data on a vehicle-wide or component-by-component basis. The health report may include logistical information about the vehicle, such as but not limited to fuel and weapon amounts, power levels, battery levels, and/or sensor-related logistical information. Differing health reports may include different amounts of data; for example, a "heartbeat" report may indicate the vehicle and/or major components are available, while a detailed health report may include detailed fault-related data and/or logistical information. The FTCM 230 may generate health reports for periodic communication (e.g., once a minute for a heartbeat report), upon request from the ground control, according to a mission plan/communication, and/or using other criteria.

The FTCM 230 may support process monitoring and recovery techniques. Checkpoints provided by middleware software 236 may record information associated with a given process to ensure recall of states and status information of the given process if the given process fails. The FTCM 230 may user services provided by middleware software 236 to verify a heartbeat associated with other services, and report any problems to the FCME 232 and/or GCME 282, perhaps as part of a health report. In addition, the FTCM 230 may send a heartbeat signal to the FCME 232 and/or GCME 282 to indicate the FTCM 230 is active.

For telemetry services, the FTCM 230 may send messages containing telemetry data that includes flight status, VMS status and pre-flight status. Sensors, such as navigation sensors 254 and/or optical sensors 260, may provide the telemetry data to the FTCM 230. The telemetry-data messages may be part of a standard operational message set. The VMS 250 may provide the telemetry-data messages to the FTCM 230. The telemetry-data messages may be in a standard format, such as the Joint Architecture for Unmanned Systems (JAUS) format. The telemetry-data messages also may not be in JAUS format, and thus may require translation to/from JAUS format.

The FTCM 230 may manage the telemetry data and report it to the FCME 232 and/or GCME 282. In addition to telemetry data, the FTCM 230 may capture engineering flight test data. An engineering ground station (not shown) may monitor the engineering flight test data. The engineering flight test data may include modes and states of the aerial vehicle 210, mission plan monitoring data, and other necessary FTCM-related functionality data. Capture and monitoring of engineering flight test data may support debugging and system characterization during development and may be removed either during a development cycle or of the aerial vehicle 210 or upon final delivery of the aerial vehicle 210.

The FTCM 230 may enable the aerial vehicle 210 to be flown either manually (e.g., as instructed by the ground control 270) or autonomously. During either manual or autonomous flight, the FTCM 230 may support maneuver constraints of a flight plan. The FTCM 230 may constantly monitor the aerial vehicle 210 to ensure the aerial vehicle 210 remains within current airspace constraints. The FCME 232 and/or GCME 282 may provide critical path geometric flight boundary constraints as part of the flight plan to the FTCM 230. The FTCM 230 may receive incremental updates to the mission plan (including the flight plan) during mission execution. The FTCM 230 may validate incoming constraints, determine which incoming constraints are acceptable or invalid and/or incorporate only acceptable constraints for the current mission. The FTCM 230 may notify the FCME 232 and/or GCME 282 about invalid constraints. If the aerial vehicle 210 breaches one or more flight plan constraints, the FTCM 230 may alert the FCME 232 and/or GCME 282.

The FTCM 230 may support loading of one or more mission plans from the FCME 232 and/or GCME 282. Each mission plan may include, but is not limited to, one or more flight plans, contingency plans, communications plans, sensor plans, and/or weapons plans. The flight plans and/or contingency plans may comprise one or more waypoints and/or one or more maneuver constraints. Each waypoint may be a location or area specifying an intermediate or final destination for the aerial vehicle during the mission and may be specified using two-dimensional (e.g., latitude/longitude, map grid points, roadway intersections, etc.) or three-dimensional coordinates (e.g., each of the above two-dimensional coordinate examples with an elevation coordinate as well). Each maneuver constraint may specify one or more boundaries for the aerial vehicle during the mission plan, one or more minimum or maximum speed limits, and/or one or more sub-flight plans (e.g., constraints within confined airspace or restrictive terrain). The contingency plans may include, but are not limited to, alarm information, command information, and/or contingency flight plans. The communications plans may include, but are not limited to, information to be communicated, times and devices for communication, communication identification information (e.g., device addresses such as but not limited to fully-qualified domain names (FQDNs), medium-access control (MAC) or Internet Protocol (IP) addresses), communication frequencies, security information (e.g., encryption/decryption keys, lists of supported security protocols for security negotiation). Many other components to a mission plan are possible as well.

The FTCM 230 may first receive the mission plan(s) from the FCME 232 and/or GCME 282. Upon reception of the mission plan(s), the FTCM 230 may provide the mission plan(s) to the VMS 250 and may ensure proper loading of the mission plan(s). After verifying the one or more mission plans have been properly loaded, the FTCM 230 may send a notification message specifying mission plan acceptance to the FCME 232 and/or GCME 282. The FTCM 230 may copy the one or more mission plan(s) as well. The FTCM 230 may translate part or all of a given mission plan (including flight plan(s) and/or contingency flight plan(s)) to enable a control interface of the VMS 250 to execute the mission plan.

The FTCM 230 may perform contingency constraint checking in the context of implementing one or more contingency flight plans in the mission plan(s). The aerial vehicle 210 may invoke one or more contingency flight plans under specified conditions (discussed below). The FTCM 230 may interface with FCME 232, GCME 282, and/or the VMS 250 to implement the contingency capabilities. In this context, the FTCM 230 may command the VMS 250 to trigger a contingency behavior, such as land, hover, continue flight plan, and fly to a rally point.

Contingency behaviors can be invoked in several ways: (1) the FCME 232 and/or GCME 282 may provide a contingency command to the FTCM 230 which in turn commands the VMS 250 to execute a contingency behavior, (2) the FTCM 232 may detect a condition (such as loss of communication with ground control 270) that requires a contingency behavior and commands the VMS 250 to execute a contingency behavior, (3) the FTCM 230 and the VMS 250 lose communications and the VMS 250 executes a contingency behavior, and (4) a flight condition requires a contingency behavior. Some of the flight conditions that may require a contingency behavior include: (a) airspace constraint corridor violations, (b) insufficient fuel thresholds, (c) receiving an excessive number of invalid commands from the FCME 232 and/or or GCME 282 (i.e., determining that the number of invalid commands received, perhaps during a period of time, exceeds a threshold, such as more than two invalid commands within one minute), (d) failure of safety critical processes, (e) loss of contingency management capability, (f) loss of communication with a controller (including manual control), and/or (g) invalid flight plan information received including missing contingency plans.

The FTCM 230 may monitor execution of the mission plan by the aerial vehicle 210 and provide vehicle-flight status back to FCME 232 and/or GCME 282. The FTCM may perform monitoring continuously, periodically, upon request, or under some other conditions. The FTCM 230 may provide vehicle-flight status during any flight phases and during either manual or autonomous flight.

The FTCM 230 may monitor the current location of the aerial vehicle 210 relative to boundaries provided by the flight plan(s) in the mission plan(s). If the current location of the aerial vehicle 210 is within a threshold distance of any flight-plan boundary and/or crosses any flight-plan boundary, the FTCM 230 may execute a contingency behavior and/or send feedback to the ground control 270 via UAV radio 264.

The FTCM 230 may determine if the various sensors aboard the aerial vehicle 210 (e.g., optical sensors 260 and/or video unit 262) are operating in accordance with sensor plan(s) of the mission plan. The FTCM 230 may receive the sensor plan(s) as part or all of the mission plan(s) and send the sensor plan(s) to a sensor manager (not shown in FIG. 2) to control the sensors while the mission plan is executed. The FTCM 230 may send the flight plan(s) of the mission plan(s) to VMS 250 to control the location of the aerial vehicle 210 (i.e., fly the UAV) in accordance with the flight plan. The FTCM 230 may parcel out required functionality of the mission plan, coordinate on-board managers of the flight plan and/or sensor plan, verify the aerial vehicle 210 is executing the mission plan, and direct the execution of contingency behaviors as need.

For example, a flight plan component of the mission plan may instruct the UAV to fly to 43° 51.3' N/99° 12.7' W at 1645 Zulu time on the mission date via a waypoint at 43° 51.293' N/99° 12.665' W. At 1645 Zulu, a communication plan may instruct the UAV to provide a health report of the UAV to a ground control at address gc1.honeywell.com using a previously determined AES 128-bit key. Then, a sensor plan of the mission plan may indicate that the UAV should activate an infrared sensor at 1646 Zulu. The mission plan may have contingency plan, mission plan and/or weapons plan components that instruct the UAV to fire Weapon #1 if the reading of the infrared sensor indicates a temperature of a heat source directly below the UAV exceeds a threshold amount.

The FTCM 230 may provide support for shutdown commands for an engine of the aerial vehicle 210 and/or the entire aerial vehicle 210, including providing safety interlocks to prevent unintended vehicle shutdown.

The FTCM 230 may support a pass-through capability for training. When the aerial vehicle 210 is in the integrated-platform-training mode, the FTCM 230 will interface between FCME 232 and/or GCME 282 and the VMS 250. Training support may include the recording of training data in non-volatile memory, providing a pass-through for status information from the training sensor 256 to FCME 232 and/or GCME 282, and the ability to change the integrated-platform mode to and from the integrated-platform-training mode, thereby enabling or disabling on-board training systems such as the training sensor 256. The pass-through provided by the FTCM 230 may include forwarding training data to a training controller on the ground for processing. The training controller may be part of controller 280 and may determine hit/kill information based on the training data.

As part of the sensor controls and services, the FTCM 230 may provide FCME 232 and/or GCME 282 with an interface to the optical sensor 260 and the video unit 262 via the FSM 238. The FTCM 230 may pass-through sensor commands received from the FCME 232 and/or GCME 282 to the FSM 238 and may provide sensor command status from the FSM 238 to the FCME 232 and/or GCME 282.

Specifically, the FTCM 230 may be equipped to send commands to the one or more lasers of the optical sensors 260. The FTCM 230 may provide safety mechanisms for the one or more lasers, including but not limited to: (a) sending command(s) to the FSM 238 to turn off hazardous sensor features when transitioning to into the integrated-platform-training mode and (b) sending a command to turn off the laser under various potentially unsafe conditions occur, such as when a laser firing signal is lost, communication with the controller is lost, transfer of control occurs, and/or when a laser fire signal command expires.

The FTCM 230 may maintain a field of view for one or more of the optical sensors 260. The FTCM 230 may send commands to the FSM 238 to maneuver one or more of the optical sensors 260 mounted in gimbal(s) and to monitor sensor gimbal angles for the gimbal-mounted sensor(s). The FTCM 230 may determine that the aerial vehicle 210 requires rotation to prevent the gimbal-mounted sensor(s) from reaching hard gimbal limits. The FTCM 230 may maintain one or more thresholds of gimbal-angle limits. Upon determining a given sensor's gimbal angle exceeded a corresponding gimbal-angle-limit threshold for the given sensor's gimbal, the FTCM 230 may send one or more commands to the VMS 250 to adjust vehicle position and/or azimuth. The FTCM 230 may also interface with the FSM 238 to provide sensor data (live or stored) to the controlling platform triggered by start and stop commands from the FCME 232 and/or GCME 282. The FTCM 232 may also provide navigation data from the VMS 250 to the one or more optical sensors 260.

The FTCM 230 may monitor fuel sensors to determine fuel consumption. The FTCM may compare a fuel-consumption level against the requirements of the current mission and provide the appropriate status to the FCME 232 and/or GCME 282.

The FTCM 230 may provide computing platform services, such as data safety, message operations, and communication monitoring. The FTCM 230 may enforce data safety of the computing platform by applying cyclic-redundancy checks (CRCs) and/or boundary checking to all messages received (e.g., from the ground control 270) to ensure that safety critical data is not corrupted. The FTCM 230 may ensure safety and validity of commands through interlock mechanisms, and only allow commands that are valid for the current integrated-platform mode. The interlock mechanisms may prevent unintended operations such as activation of a maintenance command during operational flight.

The FTCM 230 may provide communication of vehicle commands between the FCME 232 and/or GCME 282 and the VMS 250. An example list of commands includes: activation or resumption of a flight plan or contingency flight plan, tele-supervision command and control, launch commands, landing commands, pre-flight-checklist-condition verification, engine start commands following pre-flight-checklist-condition verification, rate and position "nudge" (minor adjustment) commands concerning up to four degrees of freedom, wave-off commands, waypoint vector commands, manual override commands, flight-route-modification commands, training commands (e.g., MILES commands), emergency commands, shutdown commands, render useless commands, and anti-collision light commands. In addition to the example list of commands and other commands discussed herein, many other types of commands may be communicated between the GCME 282, FCME 232, VMS 250 and/or FTCM 230 as well.

The FTCM 230 may provide conversions to support messages to and from one or more standard formats, such as the JAUS standard. The FTCM 230 may support message sequencing. After receiving a message, the FTCM 230 will verify that subsequent messages are valid for the current mode and operations. The FTCM 230 may ensure proper reception and ordering of messages required to perform a given operation (such as flight plan loading). In the event that the FTCM 230 determines that one or more received command(s) is invalid, the FTCM 230 may reject the command(s), inform the sender, and/or continue current predicable and safe operation (e.g., maintain course and speed upon reception of an invalid activation of flight plan command).

The FTCM 230 may monitor communication status of one or more data links between the aerial vehicle 210 and other entities, such as one or more ground controllers (e.g., ground control 270) and record any loss of communication. In particular, the FTCM 230 may report the condition where the aerial vehicle 210 is not receiving communication from a ground controller, but the ground controller may be receiving data from the aerial vehicle 210. The FTCM 230 may support "controller handoffs"; that is, allowing a first ground controller at one level to resume control from a second ground controller at another level.

The FTCM 230 may support one or more render useless commands sent from the FCME 232 and/or GCME 282A. In response to the render useless command, the FTCM 230 may send zeroize commands (i.e., commands to rewrite stored data and/or software with zeroes and/or random numbers) to the VMS 250 and to all on-board instances, processes, and tasks through middleware software 236. The net effect of the render useless command may be to cause the UAV to be worthless if the UAV is captured or otherwise possessed by an enemy or unauthorized personnel.

The FTCM 230 may include software and/or hardware developed in accordance with one or more development standards, such as but not limited to the DO-178B Software Considerations in Airborne Systems and Equipment Certification. Also, the FTCM 230 may be engineered to utilize a specified amount of computing resources, such as but not limited to processor time/utilization percentage, memory, input/output (I/O) resources, and/or system resources, such as buffers, pages, operating system tables/structures, semaphores or other mutual exclusion resources, and the like.

Example Message Architecture for an Aerial Vehicle Control System

FIG. 3 shows an example communication architecture 300 for the example aerial vehicle control system 200, in accordance with embodiments of the invention. The relatively-large polygon with dashed lines shown in FIG. 3 outlines components of the communication architecture 300 that are also components of the aerial vehicle 210.

The communication architecture 300 may include at least two priority levels for communications. FIG. 3 shows critical data or higher-priority communications communicated over critical-data pathways using dotted and dashed lines, and primary path or lower-priority communications communicated over primary-path pathways using solid lines. Generally speaking, the communication architecture 300 uses critical-data pathways to transmit time-sensitive or mission-critical data between the vehicle and the ground control, including commands for the vehicle (including sensors aboard the vehicle) and some sensor data, and the communication architecture 300 uses primary-path pathways to communication information that is less time-sensitive.

FIG. 3 shows FCME 232 and FTCM 230 as software components sharing a common hardware platform and software architecture. The hardware platform may be a pseudo-integrated computer system (PICS) with one or more central processing units (CPUs), shown in FIG. 3 as the "PICS-CPU" layer. FIG. 3 shows a plurality of software layers supporting the FTCM 230 and FCME 232, including board support package (BSP), operating system (OS), and middleware layers of software. In other embodiments, more or fewer layers of software may be included in the software architecture, such as described in the '274 Application. FIG. 3 depicts the FSM 238 as a software component of FTCM 230, and the FNS component 234 as a software component of the FCME 232. In other embodiments, the FTCM 230 and/or the FCME 232 may include more or fewer hardware and/or software components than shown in FIG. 3. FIG. 3 shows the common hardware platform and software architecture equipped with video unit 262.

FIG. 3 shows the VMS 250 as a software component in a separate software architecture and executing on a separate hardware platform than used for the FTCM 230 and FCME 232. Software for the VMS 250 may execute on the VMC 252 hardware platform. The VMS 250 may have a software architecture with two layers: a VMS OS layer and the VMS layer. In other embodiments, more or fewer layers of software may be included in the software architecture for the VMS 250 and/or may include more or fewer hardware and/or software components than shown in FIG. 3. The VMS 250 may communicate with FTCM 230 and FCME 232 via one or more connections between the VMC 250 and the PICS-CPU, such as but not limited to, one or more wires, cables, computer busses, and/or computer-network connections (either wired or wireless).

FIG. 3 shows a software architecture for the ground control processor 270 with the GCME 282 and GSM 286 as software components supported by the middleware software 288 layer, all executed by controller 280. The ground control 270 and aerial vehicle 210 may utilize radios and/or ports to communicate. FIG. 3 shows the ground control with the ground control (GC) radio 290 communicating with the UAV radio 264 via a network 292, such as a radio network. The ground control 270 may also, or instead, communicate with the aerial vehicle 210 using a wired or wireless connection to the port 240 of the aerial vehicle 210. For example, the port 240 may be an Ethernet port and thus the ground control 270 may communicate over an Ethernet connection with the aerial vehicle. As another example, the ground control 270 may include a wireless device, such as but not limited to one or more Wi-Fi, Wi-MAX, wireless local area network (WLAN), or wireless wide area network (WWAN) devices, configured to communicate with one or more similarly equipped devices in the port 240 of the aerial vehicle 210.

FIG. 3 shows communication of GCME Control/Status between the GCME 282 and the FTCM 230 via the FCME 232 along a primary-path pathway. The ground control 270 may interface with the aerial vehicle 210 via one or more data links between the ground control radio 290 and UAV radio 264. The GCME 282 may provide a variety of commands via the data link(s) to the FTCM 230, including but not limited to sensor commands, modes, airspace constraints, flight and contingency plans, position and rate commands, launch and land commands, anti-collision light commands, engine and power commands, fly-the-sensor maneuver commands, and emergency commands. The FTCM 230 may provide health and status information to the GCME 282. The health information may include, but is not limited to, information about the FNS component 234, FSM 238, VMS 250, and/or PICS. The status information may include, but is not limited to training status, telemetry data, fuel status and warning, flight status information, airspace constraint breech information, auto-tracking status, contingency plan activation, source data, and flight plan reject/accept status.

FIG. 3 shows communication of radio configuration data along two primary-path pathways: one utilizing data link(s) established via ground control radio 290, network 292, and UAV radio 264 and another utilizing data link(s) established via port 240. These two primary-pathways connect the FNS component 234 and the GCME 282. The radio configuration data may control the network, communication configuration and/or the UAV radio 264.

FIG. 3 shows the GCME 282 communicating mission plans and/or software over the "Mission Plan & Software Load" primary-path pathway to the FTCM 230 via port 240. The mission plans may include mission plans as described above with respect to FIG. 2. The software may include software updates to fix software errors/bugs, partially or completely updated software components, and/or partially or completely updated software-architecture layers for the PICS-CPU and/or the VMC 252. New software components and/or software-architecture layers may be installed aboard one or more processors aboard the aerial vehicle 210 in this fashion as well. FTCM 230 may provide data about mission plans and/or software via the Mission Plan & Software Load primary-path pathways as well, such as but not limited to mission-plan-loading status, software-loading status, mission-plan error reports (e.g., errors in formatting or completeness of a given mission plan), software error reports, and/or software-debugging data.

FIG. 3 shows a "Sensor Control/Status" critical-data pathway between the FTCM 230 and the optical sensors 260 via FSM 238 and video unit 262. The FTCM 230 may provide sensor commands, laser control and/or render useless commands to optical sensors 260 and/or video unit 262 via FSM 238. The FSM 238 may provide video-sensor data (i.e., compressed video, uncompressed video, sensor health, sensor status, and/or sensor-auto-tracking status from the optical sensors 260 and/or video unit 262) to the FTCM 230. The FTCM 230 may pass part or all of the video-sensor data to the GSM 286 and/or GCME 282 via one or more pathways, such as the "Video FSM to GSM/Video Stream" primary-path pathway and/or the "Critical Information" critical-data pathway shown in FIG. 3.

For example, the FTCM 230 may implement one or more "Fly the Sensor" commands by monitoring the pointing angle and field of view of a camera of the optical sensors 260 and controlling the rotation of the vehicle, perhaps via command(s) issued to the VMS 250, to maintain the desired field of view.

FIG. 3 shows VMS 250 communicating "Vehicle Control/Status" with FTCM 230 over a critical-data pathway. The FTCM 230 may receive vehicle control and status information from the VMS 250, such as, but not limited to, health and status of the VMC 252, telemetry data, data about the position of the aerial vehicle 210, flight plan execution status, flight plan load status, fuel level and consumption data, and training status. In addition, the FTCM 230 may provide the vehicle control and status information to the VMS 250, such as but not limited to mission plan (flight plan, contingency plan, rate commands (as well as position commands translated into rate commands), launch and land commands, engine and power commands, fly-the-sensor commands, emergency commands, contingency commands, manual/remote operation commands and render useless commands. The FTCM 230 may pass some or all of the vehicle control and status information to the FCME 232 and/or GCME 282 via one or more pathways, such as the "Critical Information" pathway and/or the "GCME Control/Status" primary-path pathway shown in FIG. 3.

A Second Example Aerial Vehicle Control System

Figure 4:
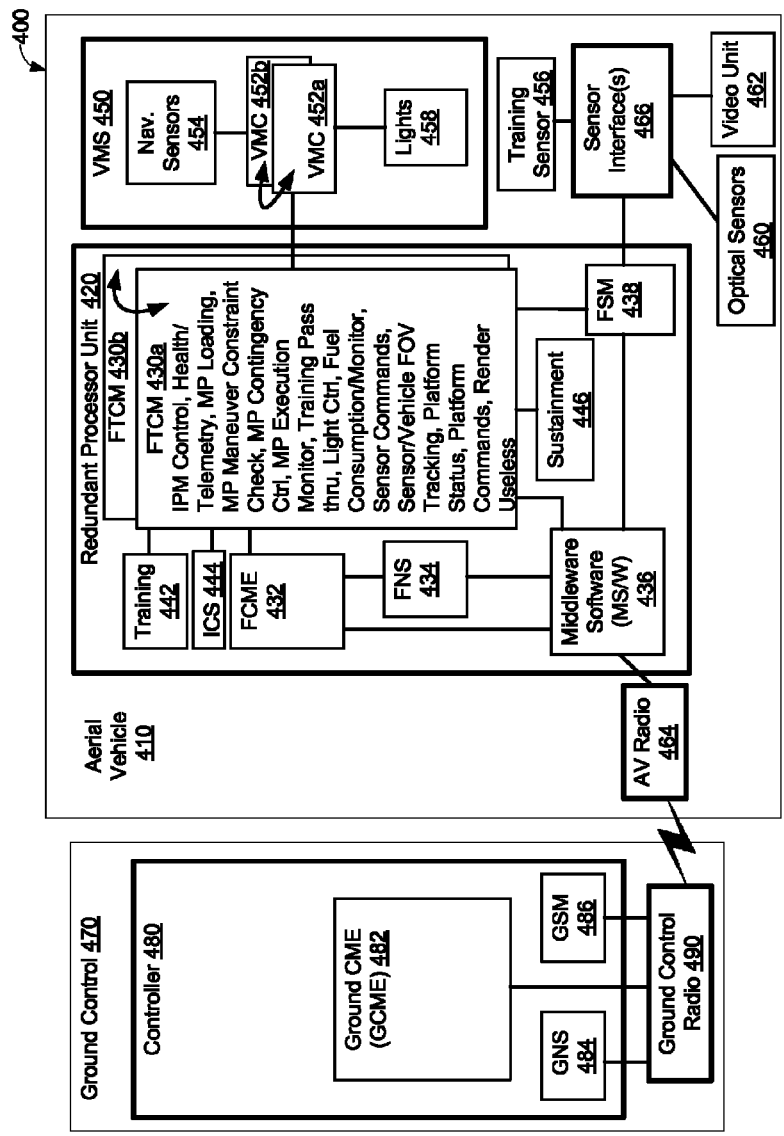
FIG. 4 shows an example aerial vehicle control system with redundant components, in accordance with embodiments of the invention.

FIG. 4 shows an example aerial vehicle control system 400 with redundant components, in accordance with embodiments of the invention. Compared to the aerial vehicle control system 200 described above with respect to FIG. 2, the aerial vehicle control system 400 is a similar and enhanced system. As described herein, each components of the aerial vehicle control system 400 with the same name as a component of the aerial vehicle control system 200 (i.e., the FTCMs 430a/430b, the FCME 432, FNS component 434, middleware software 436, FSM 438, VMS 450, VMC 452a/452b, navigation sensors 454, training sensor 456, lights 458, optical sensors 460, video unit 462, AV Radio 464, ground-control controller 480, GCME 482, GNS 484, GSM 486 and ground-control radio 490) include the same functionality as the corresponding component of the aerial vehicle control system 200 (i.e., the FTCM 230, the FCME 232, FNS component 234, middleware software 236, FSM 238, VMS 250, VMC 252, navigation sensors 254, training sensor 256, lights 258, optical sensors 260, video unit 262, AV Radio 264, ground-control controller 280, GCME 282, GNS 284, GSM 286 and ground-control radio 290, respectively) unless specifically stated otherwise below.

As shown in FIG. 4, the aerial vehicle control system 400 includes an aerial vehicle 410 (e.g., a UAV) and a ground control 470. The aerial vehicle 410 includes a redundant processor unit 420, a vehicle management system (VMS) 450, an aerial vehicle (AV) radio 464, and one or more sensor interface(s) 466.

The redundant processor unit 420 may have two or more processors, each processor configured to execute flight management software, such as but not limited to, one flight technical control manager (FTCM) per processor. Each processor of the redundant processor unit 420 may be configured to execute other software components as well; that is, the software components shown in FIG. 4 inside of the rectangle surrounding the redundant processor unit 420, such as but not limited to a flight command and mission execution (CME) component 432, a flight network system (FNS) component 434, a middleware software 436, a flight sensor manager (FSM) component 438, a training component 442, an integrated computer system (ICS) component 444, and a sustainment component 446. There may be one or more copies of each of these software components executing on each processor of the redundant processor unit 440, but only one copy is shown in FIG. 4 for simplicity.

FIG. 4 shows FTCM 430a and FTCM 430b with a double-headed arrow indicating communication between the FTCMs 430a and 430b. The FTCM 430a and FTCM 430b may be configured with one FTCM acting as an active "primary FTCM" and the other acting as an idle "backup FTCM". The text below accompanying FIG. 4A describes the use of primary and backup FTCMs in more detail.

Each FTCM 430a and 430b may monitor health and status for each of the VMCs 450a and 450b. The primary FTCM may monitor the status of the redundant processor unit via the ICS 444; that is, the ICS 444 may provide at least information about the primary or backup status of each processor of the redundant processor unit 420. The FTCMs 430a and 430b may send and/or receive appropriate signals and monitors identified by the Sustainment Model to and/or from sustainment 446 via FCME 432 (and middleware software 436). The FTCMs 430a and 430b may format and send health and status data about the VMS 450 (include the health/status of the VMCs 452a and 452b) directly to sustainment 446.

The FTCMs 430a and 430b may manage optical sensors 460 and/or video unit 462 via the sensor interface(s) 466; for example, the FTCMs 430a and 430b may manage the auto-tracking status of a laser, perhaps via the FSM component 438. The sensor interface(s) 466 may manage some or all of the optical sensors 460 and/or video unit 462 directly (that is, without intervention from the FTCMs 430a and 430b).

FIG. 4 shows the sensor interface(s) 466 may manage the training sensor 456 instead of the VMS 456. The training component 442 may manage the training sensor 456, perhaps under the guidance of the FTCMs 430a and 430b and/or the FCME 432 and/or GCME 482.

As indicated above, the FTCMs 430a and 430b include the functionality of the FTCM 230 described above. Some of the differences between the FTCMs 430a and 430b and the FTCM 230 (beyond those already mentioned above) are:

1. In addition to the integrated-platform modes described above with respect to FIG. 2, the FTCMs 430a and 430b may manage live-fire training during the integrated-platform-training mode.

2. Each VMC 452a and 452b may store one or more mission plans, perhaps including contingency flight plans. As such, the FTCMs 430a and 430b may send command(s) to the VMS 450 to activate a stored mission plan.

3. The FTCMs 430a and 430b may perform services involving training in conjunction with training component 442. The training component 442 may include a training controller. The training component 442 may be activated and/or deactivated via command(s) sent via the FCME 432 and/or GCME 482.

4. The mission plans executed by the aerial vehicle system 400 may be more complex than those executed by the aerial vehicle system 200. Thus, the FTCMs 430a and 430b may have to support loading of and management of mission plans with more waypoints and flight patterns, along with supporting additional mission plans (including more contingency flight plans) beyond those supported by the FTCM 230.

5. FIG. 4 shows the FNS component 434 disconnected from the FTCMs 430a and 430b. As such, the FTCMs 430a and 430b do not have access to radio configuration data, processed by the FNS component 434 under the control of the FCME 232 and/or GCME 282.

6. The FTCMs 430a and 430b may account for redundant operations as described below with respect to FIG. 4A.

7. Additional differences are described with respect to FIGS. 4A and 5 below.

As shown in FIG. 4, the VMS 450 includes redundant VMCs 450a and 450b. The VMCs 450a and 450b may operate as primary and backup VMCs, such as described above with respect to the processors of the redundant processor unit 420. Software for the VMS 450 may manage redundancy by communicating information between primary and backup software components such as described with respect to FTCMs 430a and 430b.

An Example Redundant Vehicle Control System

Figure 4A:
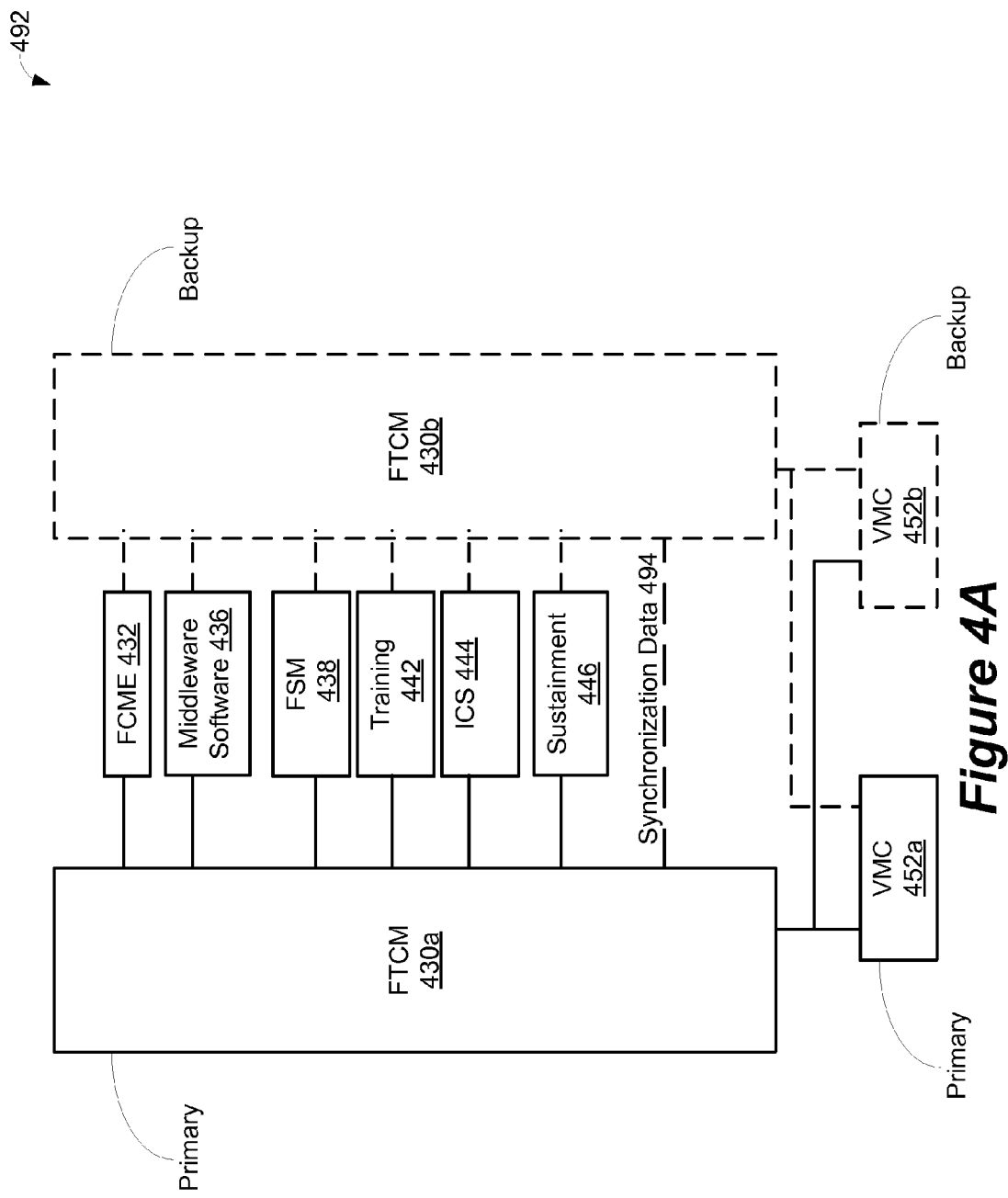
FIG. 4A shows an example block diagram of redundant FTCMs and VMCs, in accordance with embodiments of the invention.

FIG. 4A shows an example redundancy architecture 492 of redundant FTCMs 430a and 430b and VMCs 452a and 452b in accordance with embodiments of the invention. As shown in FIG. 4A and described above with respect to FIG. 4, the design of the aerial vehicle system 400 may support a multi-process/multiprocessor implementation.

The redundancy architecture 492 may indicate components as active or inactive, where active components may process data used in the operation of the aerial system 400 and the inactive components are idle. FIG. 4A shows FTCM 430a as a primary FTCM and VMC 452a as a primary VMC, as well as showing FTCM 430b as a backup FTCM and VMC 452b as a backup VMC. FIG. 4A shows active components FTCM 430a, FCME 432, middleware software 436, FSM 438, training component 442, ICS 444, sustainment 446, and VMC 452a outlined with solid lines. FIG. 4A also shows the inactive components FTCM 430b and VMC 452b outlined with dashed lines.

To account for redundant operation of the FTCMs, the primary FTCM 430a and the other active components 432, 436, 438, 442, 444, and/or 446 may communicate status and other information to the backup FTCM 430b. FIG. 4A shows communication paths from the active FTCM 430a and the active VMC 452a with solid lines and shows communication paths to the backup FTCM 430b and the backup VMC 452b as dashed lines. The backup FTCM 430b may maintain/update internal data structures (e.g., integrated-platform-mode or mission-plan-related data structures) based on the information communicated from the primary FTCM. The maintenance of data structures by the backup FTCM based on data from the primary FTCM may enable the backup FTCM to take over (nearly) immediately from the primary FTCM in event of failure of the primary FTCM.

Some examples of data communicated from the primary FTCM 430a and/or the active components 432, 436, 438, 442, 444, 446 are to the backup FTCM 430b are: integrated-platform-mode information, status of the primary FTCM and the active components, commands from the FCME 432 and/or GCME 482, networking and/or radio information, sensor data (e.g., the current location, velocity and/or acceleration of the aerial vehicle, laser-tracking status, video data), sensor configuration information, information about the lights 458, training plan information, information about mission plan status, vehicle commands, the status of the VMCs 452a and 452b, and/or SUSTAINMENT information. In addition, synchronization data 494 may be sent to the backup FTCM 430b as well. For example, one or more messages may be sent to the backup FTCM 430b at (nearly) regular intervals as a "heart beat" indicating the health and activity of the primary FTCM 430a. Primary VMC 452a and backup VMC 452b communicate similar data, including synchronization data. Many other kinds of data may be sent to the backup FTCM 430b and/or backup VMC 452b as well.

In operation, the backup FTCM 430b may detect failure of the primary FTCM 430a and responsively transition from backup to primary while the failed (and now backup) FTCM 430a is evaluated and corrected. The designation as primary or backup FTCM may correspond to a processor of the redundant processor unit 420 being designated as primary (i.e., active) or backup (i.e., standby) by the ICS 444. Thus, one reason for the failure of a primary FTCM is the corresponding failure of a primary processor of the redundant processor unit 420. The redundant processor unit 420 may enable a backup processor to take over (nearly) immediately upon failure of the primary processor. In this case, the backup FTCM executing on the backup processor may then act as the primary FTCM once the backup processor becomes the primary processor.

Many other reasons for failure of an FTCM are possible as well, including but not limited to software errors in the FTCM, failure to send and/or receive synchronization data 494 in an appropriate format and/or within a threshold time interval (i.e., "heart beat" failure), detection of an excessive number failing internal checks or audits, unavailability of resources such as memory or processor time. In addition, an FTCM may change from primary to standby operation (or vice versa) upon request of a user (e.g., ground control).

A Second Example Message Architecture for an Aerial Vehicle Control System

FIG. 5 shows an example communication architecture 500 for the aerial vehicle control system with redundant components 400, in accordance with embodiments of the invention. The relatively-large polygon with dashed lines shown in FIG. 5 outlines components of the communication architecture 500 that are also components of the aerial vehicle 410. The communication architecture 500 may include at least two priority levels for communications. FIG. 5 shows critical data or higher-priority communications communicated over critical-data pathways using dotted and dashed lines and primary path or lower-priority communications communicated over primary-path pathways shown using solid lines.

FIG. 5 shows active software components FNS 434, training component 442, sustainment component 446, FCME 432, FSM 438 and primary FTCM 430a as software components sharing a common hardware platform and software architecture. More or fewer software components may share a common hardware platform. The hardware platform may be an integrated computer system (ICS) with one or more central processing units (CPUs), shown in FIG. 5 as the "ICS-CPU" layer. FIG. 5 shows a plurality of software layers supporting the active software components, including board support package, operating system, and middleware layers of software. In other embodiments, more or fewer layers of software may be included in the software architecture, such as described in the '274 Application. FIG. 5 shows the common hardware platform and software architecture equipped with optical sensors 460 as well.

FIG. 5 shows the backup FTCM 430b residing on a separate hardware platform operating the same software architecture (i.e., having ICS-CPU, BSP, OS, and middleware software layers) that supports the active software components.

FIG. 5 shows the VMS 450 as a software component in a separate software architecture and executing on two separate hardware platforms from the hardware platforms supporting the active software components and the backup FTCM 430b. Software for the VMS 450 may execute two hardware platforms: VMCs 452a and 452b. The VMS 450 may have a software architecture with two layers: a VMS OS layer and the VMS layer. In other embodiments, more or fewer layers of software may be included in the software architecture for the VMS 450 and/or may include more or fewer hardware and/or software components than shown in FIG. 5. The hardware platforms shown in FIG. 5 may communicate with each other via one or more connections between the hardware platforms, such as described above with respect to FIG. 3.

FIG. 5 shows a software architecture for the ground control processor 470 with controller 480 executing the GCME 482 and GSM 486 software components supported by the middleware software layer 488. The ground control 470 and aerial vehicle 410 may utilize radios and/or ports to communicate. FIG. 5 shows the ground control with the ground control (GC) radio 490 communicating with the UAV radio 464 via a network 492. The communication between ground control 470 and the UAV radio 464, including use of the network 492, may be as described above with respect to FIG. 3.

FIG. 5 shows communication of GCME Control/Status between the GCME 482 and the FCME 432 along a primary-path pathway. The FCME 432 communicates mission plan control and status information to the primary FTCM 430a via a separate primary-path pathway. The ground control 470 may interface with the aerial vehicle 410 via one or more data links between the ground control radio 490 and UAV radio 464. The GCME 482 may provide a variety of commands via the data link(s) to the FCME 432 and thence to Primary FTCM 430a, including but not limited to sensor commands, modes, airspace constraints, flight and contingency plans, position and rate commands, launch and land commands, anti-collision light commands, engine and power commands, fly-the-sensor maneuver commands, and emergency commands.

FIG. 5 shows communication of Radio Configuration data along a primary-path pathway utilizing data-links between GCME 482 and FNS 434 via UAV radio 464. The radio configuration data may control the network, communication configuration and/or the UAV radio 464.

FIG. 5 shows a "Laser Control & Status" critical-data pathway between the Primary FTCM 430a to the optical sensors 460 via the FSM 438. The Primary FTCM 430a may provide sensor commands, laser control and/or render useless commands to optical sensors 460 via FSM 438. The FSM 438 may provide video-sensor data such as described above with respect to FIG. 3 to the Primary FTCM 430a. The Primary FTCM 430a and/or the FSM 438 may pass part or all of the video-sensor data to the GSM 286 and/or GCME 282 via one or more pathways, such as the "Sensor Control/Status" critical-data pathway and/or the "Critical Information" critical-data pathway shown in FIG. 5. The FTCM 430a and/or FSM 438 may implement "Fly the Sensor" commands such as described above with respect to FIG. 3.

FIG. 5 shows VMS 450 communicating "Vehicle Control/Status" with Primary FTCM 430a over a critical-data pathway. The Vehicle Control/Status pathway, including communicated vehicle control and status information, may be as described with respect to FIG. 3, with the addition of data about the status of the redundant VMCs 452a and 452b. The Primary FTCM 430a may pass some or all of the vehicle control and status information, along with other health and status information to the FCME 432 and/or GCME 482 via one or more pathways, such as the "Critical Information" critical-data pathway and/or the "GCME Control/Status" primary-path pathway shown in FIG. 5. The other health and status information may include, but is not limited to, availability (i.e., active, inactive, out of service), fault/debugging data, and/or other information about the FNS component 434, training component 442, sustainment 446, FCME 432, FSM 438, VMS 450, VMCs 452a and 452b, Backup FTCM 430b and/or the ICS-CPUs supporting the Primary FTCM 430a and/or the Backup FTCM 430b. The Primary FTCM 430 may provide the vehicle control and status information to VMS 450 via VMC 452a and/or VMC 452b.

The Primary FTCM 430a may communicate sustainment signals and monitors (described above with respect to FIG. 4) with the sustainment component 446 over the "Sustainment Data" primary-data pathway shown in FIG. 5.

The Backup FTCM 430b may receive data, such as described above with respect to FIGS. 4 and 4A, from the Primary FTCM 430a over a critical-path pathway, such as shown in FIG. 5. Similarly, the Backup VMC 452b may receive data, such as described above with respect to FIGS. 4 and 4A, from the Primary VMC over a critical-path pathway, such as shown in FIG. 5.

An Example Computing Device

Figure 6:
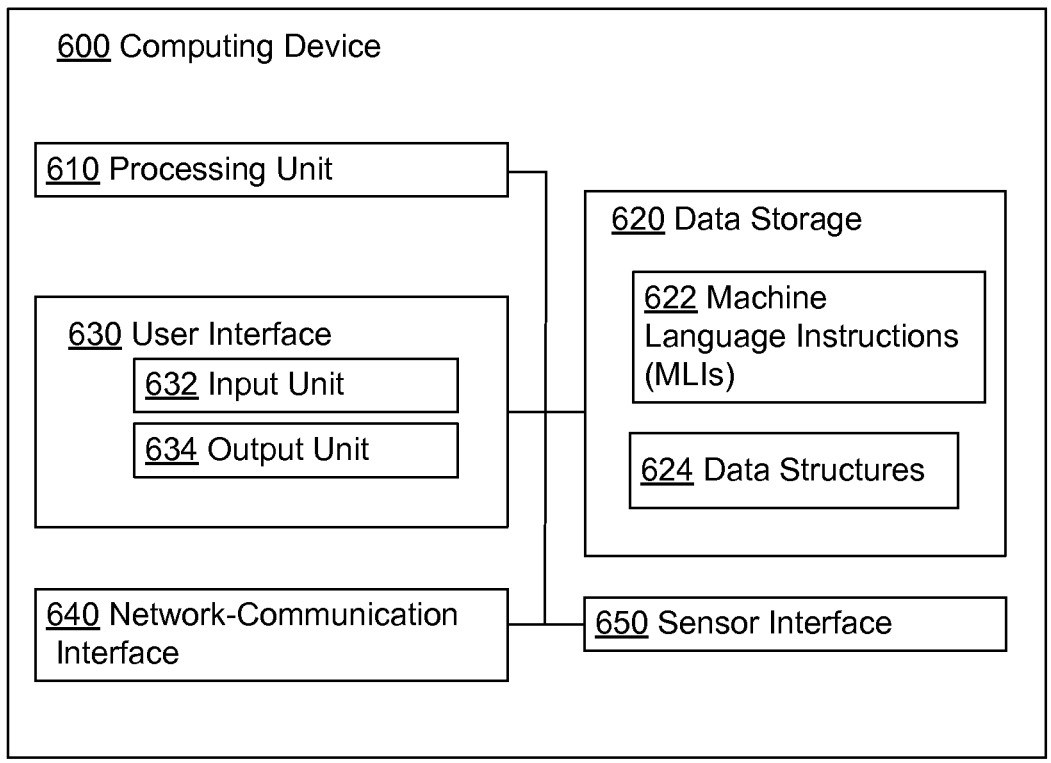
FIG. 6 is a block diagram of an example computing device, in accordance with embodiments of the invention.

FIG. 6 is a block diagram of an example computing device 600, comprising a processing unit 610, data storage 620, a user interface 630, a network-communication interface 640, and a sensor interface 650, in accordance with embodiments of the invention. A computing device 600 may be a desktop computer, laptop or notebook computer, personal data assistant (PDA), mobile phone, embedded processor, computer board (e.g., motherboard) or any similar device that is equipped with a processing unit capable of executing machine-language instructions that implement at least part of the herein-described method 700 described in more detail below with respect to FIG. 7, and/or any or all of the herein-described software, including but not limited to FTCMs, VMSs, software components, video units, operating systems, BSPs, middleware software, and/or software layers.

The processing unit 610 may include one or more central processing units, computer processors, mobile processors, digital signal processors (DSPs), microprocessors, computer chips, and similar processing units now known and later developed and may execute machine-language instructions and process data.

The data storage 620 may comprise one or more storage devices. The data storage 620 may include read-only memory (ROM), random access memory (RAM), removable-disk-drive memory, hard-disk memory, magnetic-tape memory, flash memory, and similar storage devices (i.e., tangible storage media for data and/or computer instructions executable by a processor) now known and later developed. The data storage 620 comprises at least enough storage capacity to contain machine-language instructions 622 and data structures 624.

The machine-language instructions 622 and the data structures 624 contained in the data storage 620 include instructions executable by the processing unit 610 and any storage required, respectively, to perform some or all of the herein-described functions described with respect any or all of the herein-described software, including but not limited to FTCMs, VMSs, software components, operating systems, BSPs, middleware software, video units, and/or software layers, and/or to perform some or all of the procedures described in method 700.

The user interface 630 may comprise an input unit 632 and/or an output unit 634. The input unit 632 may receive user input from a user of the computing device 600. The input unit 632 may comprise a steering device, keyboard, a keypad, a touch screen, a computer mouse, a track ball, a joystick, and/or other similar devices, now known or later developed, capable of receiving user input from a user of the computing device 600.

The output unit 634 may provide output to a user of the computing device 600. The output unit 634 may comprise a visible output device for generating visual output(s), such as one or more cathode ray tubes (CRT), liquid crystal displays (LCD), light emitting diodes (LEDs), printers, lights, and/or other similar devices, now known or later developed, capable of displaying graphical, textual, and/or numerical information to a user of computing device 600. The output unit 634 may alternately or additionally comprise one or more aural output devices for generating audible output(s), such as a speaker, speaker jack, audio output port, audio output device, earphones, and/or other similar devices, now known or later developed, capable of conveying sound and/or audible information to a user of computing device 600.

Devices making up the input unit 632 and/or the output unit 634 may be detached and/or attached to the computing device as needed via one or more ports. For example, one or more input devices (e.g., a keyboard and/or mouse) and/or output devices (e.g., a monitor) may be attached via port(s) to the computing device to maintain an aerial vehicle, but detached before the aerial vehicle attempts to take flight. The one or more ports may be part of the computing device 600, such as ports for the input unit 632, the output unit 634, and/or the network-communication interface 640 described below.

The network-communication interface 640 may send and receive data over a wired-communication interface and/or a wireless-communication interface. The data may be sent and received using digital and/or analog techniques, and may include textual, graphical, video, audio, binary data, and/or other types of data. The wired-communication interface, if present, may comprise a wire, cable, fiber-optic link or similar physical connection, such as a USB, SCSI, Fire-Wire, and/or RS-232 connection, to a data network, such as a wide area network (WAN), a local area network (LAN), one or more public data networks, such as the Internet, one or more private data networks, or any combination of such networks. The wireless-communication interface, if present, may utilize an air interface, such as a Bluetooth™, ZigBee, Wireless WAN (WWAN), Wi-Fi, and/or WiMAX interface to a data network, such as a WWAN, a Wireless LAN, one or more public data networks (e.g., the Internet), one or more private data networks, or any combination of public and private data networks. In some embodiments, the network-communication interface 640 may send and/or receive data over multiple communication frequencies, as well as being able to select a communication frequency out of the multiple communication frequency for utilization. The wireless-communication interface may also, or instead, include hardware and/or software to receive communications over a data-link via an antenna.

The sensor interface 650 may permit communication with one or more sensors to permit the sensors to provide sensor data to the computing device 600 and/or to receive commands that permit sensor maintenance (e.g., setup commands, configuration parameter settings, and the like). The sensor interface 650 may include a wired-sensor interface and/or a wireless-sensor interface. Examples of the one or more sensors include, but are not limited to, the herein-described navigation sensors, optical sensors, lights, radios, and/or training sensors. The wired-sensor interface and the wireless-sensor interface may utilize the technologies described above with respect to the wired-communication interface of the network-communication interface 640 and the wireless-communication interface of the network-communication interface 640, respectively.

An Example Method for Executing a Mission Plan

Figure 7:
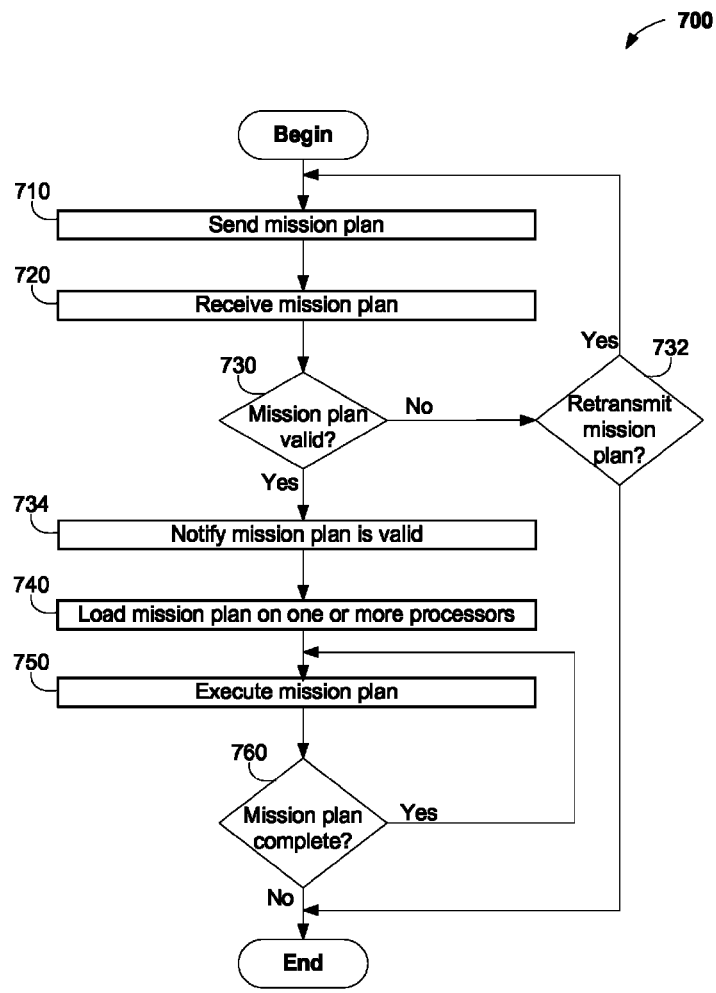
FIG. 7 is a flowchart depicting an example method for executing a mission plan, in accordance with embodiments of the invention.

FIG. 7 is a flowchart depicting an example method 700 for executing a mission plan, in accordance with embodiments of the invention. It should be understood that each block in this flowchart and within other flowcharts presented herein may represent electronic hardware, such as, but not limited to, one or more components of the aerial vehicles and/or ground control described above with respect to FIGS. 1-5 and/or the computing device described above with respect to FIG. 6, and/or computer software, such as, but not limited to, one or more software entities, modules, segments, layers, functions, routines, subroutines, data structures, objects, messages, or portions of computer program code, which includes one or more executable instructions for implementing specific logical functions or steps in the process.

Alternate implementations are included within the scope of the example embodiments in which functions described herein as blocks of the method may be executed out of order from that shown or discussed, including substantially concurrently or in reverse order, depending on the functionality involved, as would be understood by those reasonably skilled in the art of the described embodiments.

Method 700 begins at block 710. At block 710, a mission plan may be sent. A ground control may send the mission plan. The mission plan may include the components of mission plans described above, in particular with respect to FIGS. 2 and 4.

At block 720, the mission plan may be received. The mission plan may be received by an aerial vehicle, such as aerial vehicle 210 described above with respect to FIGS. 2 and 3 or aerial vehicle 410 described above with respect to FIGS. 4, 4A, and 5. An FTCM, FCME, VMS and/or other software component designated as an "MP Loader" executing on a designated processor (e.g., a PICS-CPU, VMC, an active ICS-CPU) may receive the mission plan. The mission plan may be loaded via a radio aboard the aerial vehicle and/or via a port of the aerial vehicle, such as described above with respect to FIGS. 2 and 4.

If the aerial vehicle is equipped with redundant processors, the redundant processors may be synchronized and/or communicate information between primary and backup processors, such as described above with respect FIGS. 4, 4A, and 5, and particularly with respect to the ICS-CPUs and VMCs. This synchronization and/or communication may occur continuously throughout operation of the aerial vehicle.

At block 730, the validity of the mission plan may be determined. The MP Loader may validate the mission plan, perhaps with the aid of other software and/or hardware components. The MP Loader may validate the mission plan on a mission-plan wide basis, a component-by-component basis, and/or on a data-checking basis. Validity checks on the mission-plan wide basis may ensure a given mission plan has all expected components, such as flight plans or sensor plans. Example validity checks on a component-by-component basis include: (a) determining a flight plan or contingent flight plan has an expected number of waypoints and (b) verifying a sensor plan or weapons plan only utilizes sensors or weapons, respectively, which are aboard the aerial vehicle. Validity checks on a data-checking basis may ensure correct transmission of the received mission plan using cyclic redundancy codes (CRCs) and/or encryption/decryption algorithms. Many other validity checks and bases for validity checking are possible as well.

If the mission plan is determined to be invalid, method 700 may proceed to block 732. If the mission plan is determined to be valid, method 700 may proceed to block 734.

At block 732, part or all of the mission plan may be retransmitted. The ground control and the MP Loader may coordinate the retransmission of the mission plan. Ground control may be notified which portions of the mission plan are requested to be retransmitted, as well as information about which validity check(s) failed at the aerial vehicle. In response, ground control may retransmit part or all of the mission plan to the aerial vehicle. A partial retransmission may be attempted if validity checks determine only part of the mission plan is invalid; e.g., if ground control is informed that only a contingent flight plan is invalid.

Another response may be to abort transmission of the mission plan if, for example, the mission plan needs to be reformulated (e.g., a missing mission-plan component needs to be written or the mission has changed) or if a number of retransmission attempts exceeds a threshold (e.g., the same portions of the mission plan have been resent five times).

If part or all the mission plan is to be retransmitted, method 700 may proceed to block 710. If the mission plan is not to be retransmitted, method 700 may end.

At block 734, a notification that the mission plan is valid may be sent. The MP Loader and/or another software component of the aerial vehicle may send the notification. The notification may include identifying information about the mission plan and/or the aerial vehicle (e.g., "Mission plan ALPHA-4 received and validated at UAV #33"). The notification may include timing and/or resource information as well.

At block 740, the mission plan may be loaded into one or more processors. The MP Loader may coordinate the loading of the mission plan onto the one or more processors, which may include one or more ICS—CPUs, PICS—CPUs, and/or VMCs as described above with respect to FIGS. 2, 3, 4, 4A, and 5 and/or a computing device as described above with respect to FIG. 6. The MP Loader and/or other software component may translate the mission plan into one or more commands before transmission to the processor(s). The commands may be processor-independent (e.g., the same commands are used on all types of processors) or processor-dependent. Once received, the receiving processor(s) may verify, store, and/or execute the mission plan and/or commands.

At block 750, at least part of the mission plan may be executed. Execution of the mission plan may include executing launch and/or lift-off commands, directing the aerial vehicle to travel along one or more flight plans of the mission plan, and/or executing one or more landing and/or shutdown commands.

The VMS and/or VMCs described above with respect to FIGS. 2-5A may determine a current location of the aerial vehicle. The current location may be determined using one or more navigation sensors, such as described above with respect to FIGS. 1, 2, and 4. The current location may be compared to the flight plan, and if the current location of the aerial vehicle is outside the flight plan, a contingent flight plan of the mission plan may be executed. The VMS and/or VMCs may determine a current velocity and/or current acceleration of the aerial vehicle as well.

While traveling along the flight plan, the aerial vehicle may operate as directed by the ground control or operate autonomously. A "hand-off" operation or command may change operation from ground-control controlled to autonomous control or vice versa.

Sensors aboard the aerial vehicle may operate during execution of the flight plan. For example, camera(s) aboard the aerial vehicle may generate video data. A video unit may compress and send the video data to ground control. Optical, training, and/or navigational sensors may be aboard the aerial vehicle and used as described above with respect to FIGS. 2, 3, 4, and 5. The sensors may be operated and controlled according to a sensor plan (which may be a component of the mission plan), as commanded by ground control and/or as directed by software aboard the aerial vehicle. Fuel sensor(s) may receive fuel data. The fuel data may determine a fuel level. Processors aboard the aerial vehicle and/or ground control may communicated sensor data (including but not limited to video data, data from optical, navigational, and/or training sensors, fuel data and/or the fuel level, and feedback from the sensors). Sensor control of the aerial vehicle, e.g., fly-by-sensor operation, may be provided as well.

Communication between software and/or hardware components of the aerial vehicle may be prioritized and/or organized along communication pathways, such as the primary-path and/or critical-data priorities and pathways, described above with respect to FIGS. 3 and 5. Communication may take place according to a communication plan, such as described above with respect to FIG. 2. Communication with the ground control may include health reports, such as described above with respect to FIG. 2.

The aerial vehicle may be equipped with one or more lights, which may be controlled as commanded by ground control and/or as directed by software aboard the aerial vehicle. The lights act as anti-collision lights by being turned on in response to detecting a nearby vehicle or object. The lights may be controlled by a sensor plan and/or the mission plan as well.

The aerial vehicle may operate in an integrated-platform mode, such as the integrated-platform modes described above with respect to FIG. 2. The aerial vehicle may receive one or more commands while executing the mission plan. The commands may be executed depending on whether the commands are appropriate for the integrated-platform mode.

The aerial vehicle may receive a render useless command, perhaps from the ground control or as part of a contingency plan. In response, the aerial vehicle may zeroize or otherwise scramble/self-destruct memory, hardware, and/or software of the aerial vehicle.

At block 760, a determination may be made as to whether the mission plan is complete. The determination may be made based on: (a) a specific indication in the mission plan that the mission plan is complete, (b) execution of a contingent plan indication completion, (c) execution of a completion command (e.g., render useless, shutdown or landing command), (d) an amount of time since receiving communication from the ground control (e.g., if no communication received from ground control within an hour), and/or (e) a state of the aerial vehicle (e.g., the aerial vehicle is powering off or is rendered useless). Other techniques for determining whether the mission plan is complete are possible as well.

If the mission plan is not complete, method 700 may proceed to block 750. If the mission plan is complete, method 700 may end.

CONCLUSION

Exemplary embodiments of the present invention have been described above. Those skilled in the art will understand, however, that changes and modifications may be made to the embodiments described without departing from the true scope and spirit of the present invention, which is defined by the claims. It should be understood, however, that this and other arrangements described in detail herein are provided for purposes of example only and that the invention encompasses all modifications and enhancements within the scope and spirit of the following claims. As such, those skilled in the art will appreciate that other arrangements and other elements (e.g. machines, interfaces, functions, orders, and groupings of functions, etc.) can be used instead, and some elements may be omitted altogether.

Further, many of the elements described herein are functional entities that may be implemented as discrete or distributed components or in conjunction with other components, in any suitable combination and location, and as any suitable combination of hardware, firmware, and/or software.

What is claimed is:

1. An aerial vehicle comprising:
 a vehicle management system configured to navigate the aerial vehicle; and
 a redundant processing unit comprising a first processor and a second processor, wherein the first processor is configured to:
  receive a mission plan comprising a flight plan and a contingency plan,
  validate the mission plan by at least determining the mission plan includes the flight plan,
  after determining the mission plan is valid, execute the mission plan by at least providing the mission plan to the vehicle management system, wherein the vehicle management system is configured to direct the aerial vehicle to travel along the flight plan, and
  synchronize the first processor and the second processor, and wherein the second processor is configured to:
  detect a failure of the first processor by at least one of failing to receive synchronization data from the first processor in an appropriate format or within a threshold time interval, detecting a software error in the first processor, or detecting unavailability of resources of the first processor, and,
  responsive to detecting the failure of the first processor, receive the mission plan, validate the mission plan, and execute the mission plan.

2. The aerial vehicle of claim 1, wherein the first processor is configured to synchronize the first processor and the second processor by at least communicating data to the second processor.

3. The aerial vehicle of claim 2, wherein the first processor is configured to synchronize the first processor and the second processor by at least communicating data to the second processor at regular intervals.

4. The aerial vehicle of claim 2, wherein the data comprises at least one of mission execution commands or information about a status of the mission plan.

5. The aerial vehicle of claim 2, further comprising a sensor, wherein the data comprises at least one of sensor data or data indicative of a configuration of the sensor.

6. The aerial vehicle of claim 5, wherein the sensor data comprises at least one of data indicating a current location of the aerial vehicle, a velocity of the aerial vehicle, an acceleration of the aerial vehicle, or video data.

7. The aerial vehicle of claim 5, wherein the sensor comprises at least one of a video sensor, a laser designator, a chemical sensor, a biological sensor, a smoke detector, a radiation detector, or an electromagnetic wave detector.

8. The aerial vehicle of claim 1, wherein the second processor is configured to detect failure of the first processor by at least failing to receive synchronization data from the first processor in an appropriate format or within a threshold time interval.

9. The aerial vehicle of claim 1, wherein the second processor is configured to detect failure of the first processor by at least detecting a software error in the first processor or unavailability of resources of the first processor.

10. The aerial vehicle of claim 1, where the redundant processing unit comprises a first redundant processing unit, the aerial vehicle further comprising:
 at least one navigational sensor; and
 a second redundant processing unit coupled with the first redundant processing unit, wherein the second redundant processing unit comprises a third processor and a fourth processor, wherein at least one of the third processor or the fourth processor is configured to receive navigational data from the at least one navigational sensor, determine a current location of the aerial vehicle based on the navigational data, and communicate the current location of the aerial vehicle to at least one of the first or second processors of the first processing unit.

11. The aerial vehicle of claim 10, further comprising a fuel sensor, and wherein the second processing unit is configured to receive fuel data from the fuel sensor, determine a fuel level based on the fuel data, and communicate the fuel level to at least one of the first or second processors of the first processing unit, and wherein the first processing unit is configured to communicate the flight path to at least one of the third or fourth processors of the second processing unit.

12. The aerial vehicle of claim 1, wherein the flight plan comprises one or more waypoints for a particular mission and the contingent flight plan includes a plan to at least one of land the aerial vehicle, hover the aerial vehicle, continue the flight plan, or fly the aerial vehicle to a rally point.

13. A method comprising:
 receiving at a first processor of a redundant processing unit of an aerial vehicle a mission plan, wherein the mission plan comprises a flight plan and a contingency plan;
 determining, by the first processor, that the mission plan is valid, wherein determining the mission plan is valid comprises determining the mission plan includes the flight plan;
 after determining the mission plan is valid, executing by the first processor the mission plan by at least providing the mission plan to a vehicle management system of the aerial vehicle, the vehicle management system being configured to navigate the aerial vehicle, wherein the vehicle management system is configured to direct the aerial vehicle to travel along the flight plan; and
 synchronizing, by the first processor, the first processor with a second processor of the redundant processing unit of the aerial vehicle;
 detecting, by the second processor, failure of the first processor by at least one of:

failing, by the second processor, to receive synchronization data from the first processor in an appropriate format or within a threshold time interval, detecting, by the second processor, a software error in the first processor, or detecting, by the second processor, unavailability of resources of the first processor; and responsive to detecting the failure of the first processor:
receiving, by the second processor, the mission plan,
validating, by the second processor, the mission plan, and
executing, by the second processor, the mission plan.

14. The method of claim 13, further comprising;
determining by at least one of the first processor or the second processor that the mission plan is not valid; and
responsively requesting by at least one of the first processor or the second processor retransmission of at least part of the mission plan.

15. The method of claim 13, wherein synchronizing the first processor with the second processor comprises communicating data from the first processor to the second processor.

16. The method of claim 15, where communicating data from the first processor to the second processor comprises communicating data from the first processor to the second processor at regular intervals.

17. The method of claim 15, wherein the data comprises at least one of mission execution commands or information about a status of the mission plan, sensor data, or data indicative of a configuration of the sensor.

* * * * *